US010666176B2

(12) United States Patent
Shinoda et al.

(10) Patent No.: US 10,666,176 B2
(45) Date of Patent: May 26, 2020

(54) MOTOR DRIVE SYSTEM INCLUDING SERVOMOTOR FOR BUFFER INCLUDING PLURAL WINDINGS

(71) Applicant: FANUC CORPORATION, Minamitsuru-gun, Yamanashi (JP)

(72) Inventors: Shougo Shinoda, Yamanashi (JP); Satoshi Ikai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 51 days.

(21) Appl. No.: 16/155,301

(22) Filed: Oct. 9, 2018

(65) Prior Publication Data

US 2019/0115858 A1    Apr. 18, 2019

(30) Foreign Application Priority Data

Oct. 13, 2017  (JP) .................. 2017-199119

(51) Int. Cl.
| | |
|---|---|
| *H02P 11/04* | (2006.01) |
| *H02P 5/74* | (2006.01) |
| *H02P 5/50* | (2016.01) |
| *H02P 6/04* | (2016.01) |
| *H02K 7/02* | (2006.01) |
| *H02P 27/08* | (2006.01) |

(52) U.S. Cl.
CPC .............. *H02P 11/04* (2013.01); *H02K 7/025* (2013.01); *H02P 5/50* (2013.01); *H02P 5/74* (2013.01); *H02P 6/04* (2013.01); *H02P 27/08* (2013.01); *H02P 2201/03* (2013.01); *H02P 2205/03* (2013.01); *H02P 2205/05* (2013.01)

(58) Field of Classification Search
CPC ...... H02P 27/06; H02P 5/74; H02P 6/04; H02P 11/04; H02K 7/025; G05B 19/404
See application file for complete search history.

(56) References Cited

U.S. PATENT DOCUMENTS

| | | | |
|---|---|---|---|
| 8,278,849 B2 | 10/2012 | Iwashita et al. | |
| 10,133,249 B2 | 11/2018 | Ikai et al. | |
| 2010/0117568 A1* | 5/2010 | Iwashita .................. | H02P 21/14 |
| | | | 318/400.02 |
| 2013/0009576 A1 | 1/2013 | Iwashita et al. | |

FOREIGN PATENT DOCUMENTS

| | | |
|---|---|---|
| JP | 2010115063 A | 5/2010 |
| JP | 2013017305 A | 1/2013 |
| JP | 2013-009524 A | 10/2013 |
| JP | 2015226344 A | 12/2015 |
| JP | 2016-046833 A | 4/2016 |
| JP | 2017130995 A | 7/2017 |

* cited by examiner

*Primary Examiner* — Jorge L Carrasquillo
*Assistant Examiner* — Said Bouziane
(74) *Attorney, Agent, or Firm* — RatnerPrestia

(57) ABSTRACT

A motor drive system includes: a flywheel; a servomotor for buffer which includes a plurality of independent windings and allows the flywheel to rotate; a plurality of inverters for buffer respectively connected to the windings; a plurality of converters respectively connected to the DC links; inverters for drive which perform power conversion between a DC power in the DC links and an AC power which is a drive power or a regenerative power of the servomotor for drive; and a motor control unit for buffer configured to control driving of the servomotor for buffer by controlling power conversion of the respective inverters for buffer respectively connected to the windings.

9 Claims, 9 Drawing Sheets

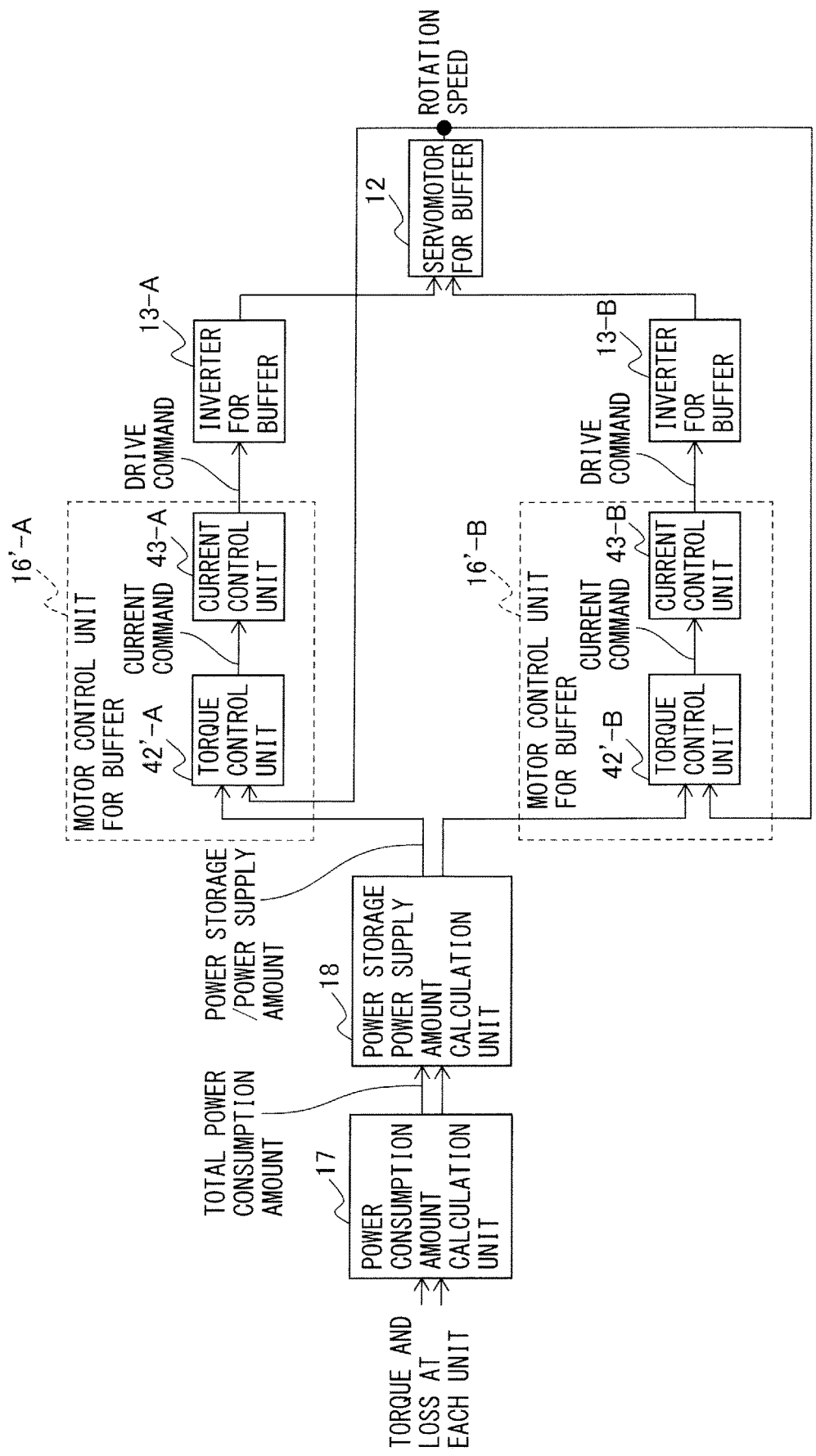

MOTOR DRIVE SYSTEM INCLUDING SERVOMOTOR FOR BUFFER INCLUDING PLURAL WINDINGS

CROSS-REFERENCE TO RELATED APPLICATION

This application is a new U.S. Patent Application that claims benefit of Japanese Patent Application No. 2017-199119, filed Oct. 13, 2017, the disclosure of this application is being incorporated herein by reference in its entirety for all purposes.

BACKGROUND OF THE INVENTION

1. Field of the Invention

The present invention relates to a motor drive system including a servomotor for buffer including a plurality of windings.

2. Description of the Related Art

In a motor drive system for driving a servomotor provided to machines including a machine tool, a robot, etc., (hereinafter referred to as "servomotor for drive), an AC power supplied from a power supply is converted by a converter (rectifier) to a DC power so as to be outputted to a DC link, further, the DC power of the DC link is converted by an inverter to an AC power, and the AC power is used as a power for driving the servomotor for drive provided to each drive axis. Typically, one converter is provided to a plurality of inverters for the purpose of reducing costs of the motor drive system or a space occupied. In other words, the converter for converting an AC power supplied from the AC power supply to a DC power is configured to be a power supply unit common to the plurality of inverters for drive (servo amplifiers), and using the DC power outputted from the power supply unit, the plurality of inverters for drive generate an AC power for driving each servomotor for drive.

When, in the motor drive system, the servomotor for drive is accelerated or decelerated, an output or regeneration of a large AC power with respect to the AC power supply is demanded so that a power peak occurs. In particular, in the motor drive system in which the plurality of inverters for drive are connected to the converter, a power peak to occur can be also further large. The larger a power peak is, the larger a power supply capacity and operation costs of the motor drive system become, while a power trouble, such as a power failure and flicker, occurs at a power supply side, and it is thus desirable to decrease a power peak.

To decrease a power peak, there has been conventionally employed a method in which the DC link which connects the converter for motor drive system and the inverters for drive to each other is provided with a power storage device capable of storing a DC power and an energy consumed or regenerated by the servomotor for drive is suitably transferred through the DC link. According to the method, a regenerative power occurring from the servomotor for drive during deceleration of the servomotor for drive can be stored in the power storage device and a stored power can be reused during acceleration of the servomotor for drive so that a power peak can be decreased. In other words, employing the power storage device which transfers a power with respect to the DC link enables an adaptation to also an operation (acceleration or deceleration) of the servomotor for drive which necessitates a power consumption larger than a maximum output power of the power supply unit.

By way of example, in a press machine, a maximum power consumption which is generated while a press operation is performed is very large, which may cause a problem of a power supply capacity shortage. Then, in the motor drive system in the press machine, the DC link is provided with the power storage device, and a power is supplied from the power storage device when the press machine consumes a large power, thereby enabling driving of the press machine under the power supply having a low capacity. Examples of the power storage device may include that which uses a flywheel. For example, when a power consumption of the servomotor for drive is small, a servomotor for buffer to which the flywheel is connected is allowed to rotate at a constant speed, and when a power consumption becomes large due to acceleration or deceleration of the servomotor for drive, etc., a rotation speed of the servomotor for buffer is decreased to perform power regeneration through an inverter for buffer, and a DC power for driving the servomotor for drive is supplied to the DC link. Thereby, also in a case of such an acceleration or deceleration operation as to necessitate a power consumption larger than a maximum power conversion amount which is a maximum amount within which the converter can convert a power, driving is enabled using a regenerative power from the servomotor for buffer having a rotation energy to which the flywheel is connected.

For example, as disclosed in Japanese Unexamined Patent Publication (Kokai) No. 2013-009524, there has been known a motor drive apparatus, comprising: an AC/DC converter which converts an AC power supplied from an AC power supply to a DC power; a DC/AC converter which converts a DC power to an AC power for driving a motor or converts an AC power regenerated by the motor to a DC power; a DC link unit which connects a DC side of the AC/DC converter to a DC side of the DC/AC converter and delivers the DC power; an energy storage unit which includes at least one capacitor storage unit and at least one flywheel storage unit each of which is connected to the DC link unit and stores the DC power from the DC link unit or supplies the same to the DC link unit; a motor control unit which, on the basis of a motor operation command for commanding an operation of the motor, performs a control so that the DC/AC converter outputs a desired AC power; and an energy control unit which performs a control so that the energy storage unit stores the DC power from the DC link unit or supplies the same to the DC link unit.

For example, as disclosed in Japanese Unexamined Patent Publication (Kokai) No. 2016-046833, there has been known a control system for servomotors for driving axes in an industrial machinery or machine tool, comprising: a plurality of first servomotors configured to drive axes; a plurality of converters configured to convert an AC voltage to a DC voltage; a plurality of first inverters configured to receive a DC voltage from the converters and convert the DC voltage to an AC voltage to drive the plurality of first servomotors or convert an AC power regenerated from the first servomotors to a DC power; a second servomotor configured to rotate an inertial body; a plurality of second inverters configured to receive a DC voltage from the converters and convert the same to an AC voltage to drive the second servomotor or convert an AC power regenerated from the second servomotor to a DC power; and a servomotor control device configured to control the plurality of first servomotors and the second servomotor, wherein the number of the second servomotor is smaller than that of the second inverters, at least one second servomotor includes a plurality of independent windings, and at least a part of the second inverter is connected to the plurality of independent windings provided to the one second servomotor.

SUMMARY OF INVENTION

In the motor drive system in which the DC link which provides connection between the converter and the inverters for drive is provided with the flywheel type power storage device including the servomotor for buffer and the inverter for buffer, when the machine (machine tool and robot) to which the servomotor for drive is provided has a large size, the flywheel type power storage device is also enlarged and costs are also increased. Further, a speed of the servomotor for buffer in the power storage device is controlled so as to perform storage and discharge of a DC power by the power storage device, and consequently it has been necessary to create a speed command in accordance with an operation state and a power consumption of the servomotor for drive so as to inevitably complicate a control of the servomotor for buffer. Further, since, in general, in a speed control of a servomotor, there is a time lag to follow an actual speed in response to a speed command, the flywheel type power storage device in which a speed control of the servomotor for buffer is performed exhibits a poor responsiveness to a power discharge command and a power storage command. Accordingly, in the motor drive system including the flywheel type power storage device, it has been desired to realize a small-sized and low-cost power storage device easily controlled and exhibiting a high responsiveness.

According to one aspect of the present disclosure, a motor drive system includes: a flywheel capable of storing a rotation energy; a servomotor for buffer which includes a plurality of independent windings and allows the flywheel to rotate; a plurality of inverters for buffer respectively connected to the windings, the inverters for buffer performing power conversion between an AC power which is a drive power or a regenerative power of the servomotor for buffer and a DC power in DC links to which the inverters for buffer are respectively connected; a plurality of converters respectively connected to the DC links to which the inverters for buffer are respectively connected, the converters performing power conversion between an AC power at a power supply side and a DC power in the DC links, respectively; inverters for drive which are connected to any of the DC links and perform power conversion between a DC power in the DC links and an AC power which is a drive power or a regenerative power of servomotors for drive; and motor control units for buffer configured to control driving of the servomotor for buffer by controlling power conversion of the respective inverters for buffer respectively connected to the windings.

BRIEF DESCRIPTION OF THE DRAWINGS

The present invention will be more clearly understood with reference to the following accompanying drawings:

FIG. 9 is a block diagram illustrating a control loop with respect to the servomotor for buffer in the power storage device in the motor drive system according to the second embodiment.

DETAILED DESCRIPTION

Hereinafter, a motor drive system including a servomotor for buffer including a plurality of windings will be described with reference to the accompanying drawings. In each figure, similar members are assigned similar reference signs. Further, it is assumed that the elements to which the same reference signs are assigned in different drawings mean those having the same functions. Moreover, to facilitate understanding, these figures are suitably changed in scale. The embodiments illustrated in the figures are one example to carry out the present invention, and the present invention is not to be limited to the illustrated embodiments. In addition, it is assumed that an "output of a servomotor for drive" includes a "power consumption amount of the servomotor for drive" and a regenerative power amount of the servomotor for drive" and an "output of a servomotor for buffer" includes a "power consumption amount of the servomotor for buffer" and a regenerative power amount of the servomotor for buffer". Still further, a rotation angular velocity of the servomotor for drive and the servomotor for buffer will be simply referred to as "rotation speed".

A motor drive system according to an embodiment of the present disclosure is used for such a system that a plurality of servomotors for drive for driving a drive axis in a machine including a machine tool and a robot are provided, and accordingly a plurality of inverters for drive which supply an AC power to drive the servomotors for drive and a plurality of converters are provided. In the motor drive system according to an embodiment of the present disclosure, a power storage device in which a servomotor for buffer for rotating a flywheel includes a plurality of independent windings is employed. Power conversion of each of inverters for buffer connected to respective windings of the servomotor for buffer is separately controlled so as to control driving of the servomotor for buffer. Hereinafter, embodiments of the present disclosure will be described.

Figure 1:
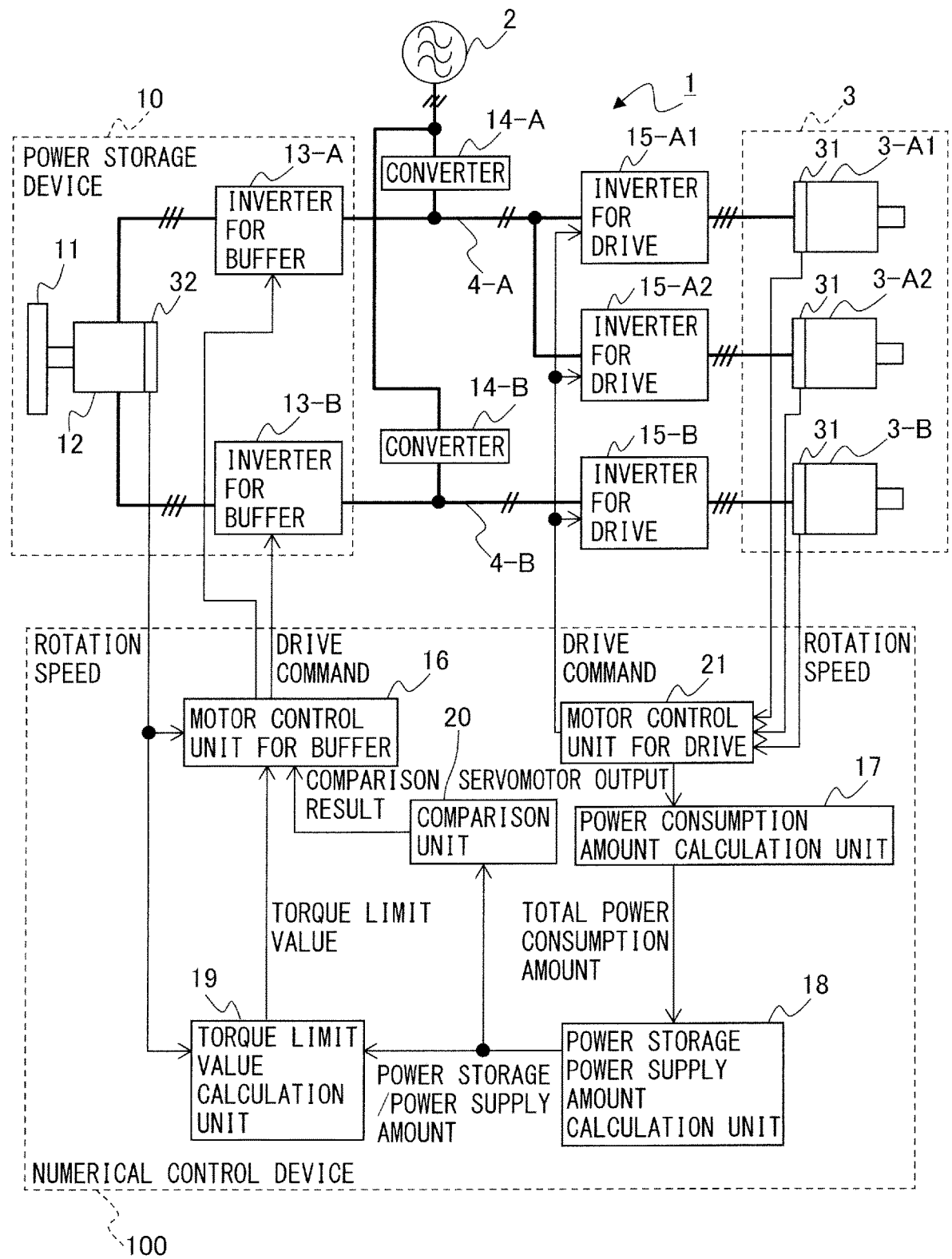
FIG. 1 is a block diagram of a motor drive system according to a first embodiment.
Figure 8:
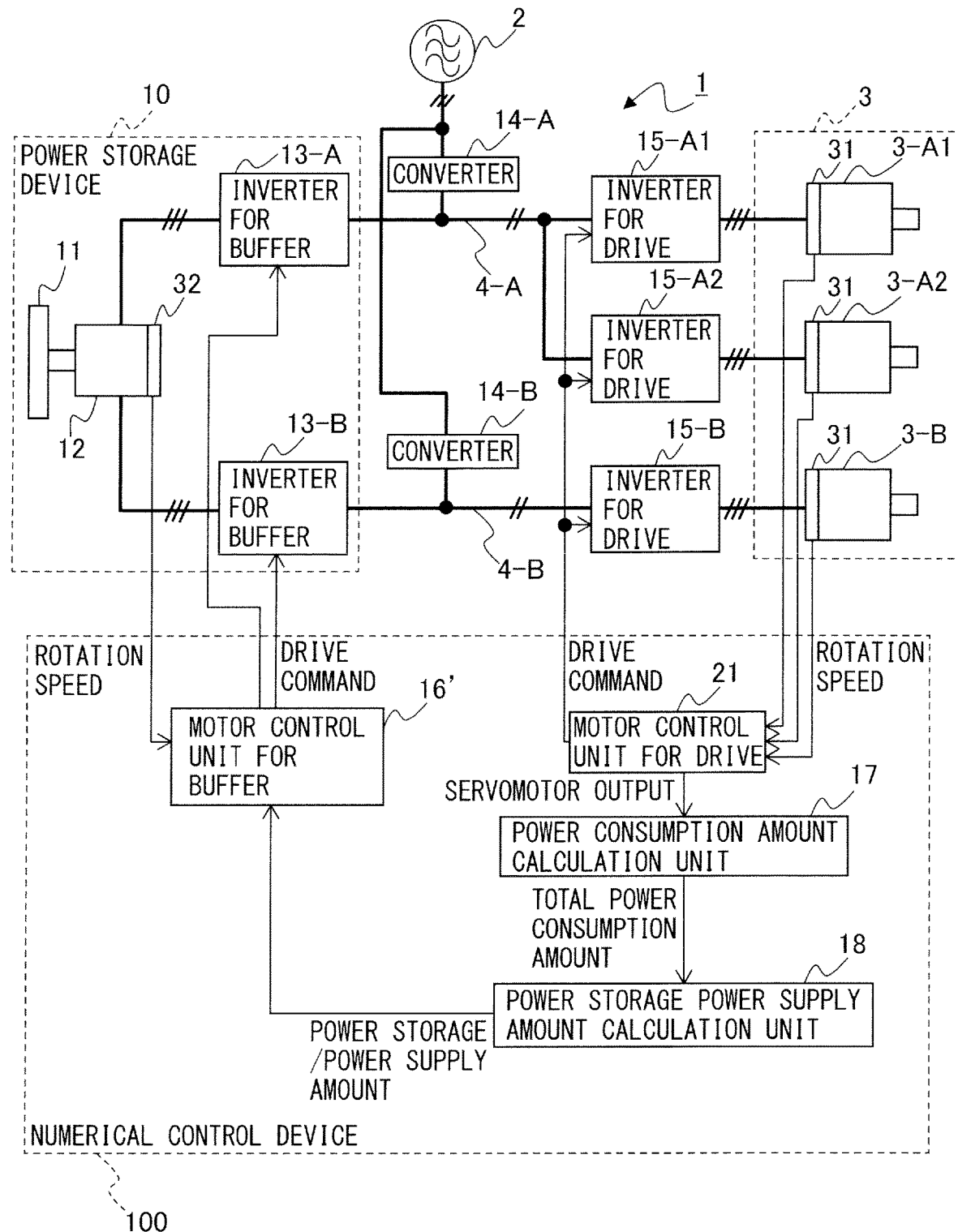
FIG. 8 is a block diagram of the motor drive system according to a second embodiment.

FIG. 1 is a block diagram of a motor drive system according to a first embodiment. Herein, in the first embodiment and a second embodiment as described below, by way of example, there will be described a case in which three servomotors for drive 3-A1, 3-A2, and 3-B are controlled by a motor drive system 1 connected to a power supply 2. In FIG. 1 and FIG. 8 as described below, by way of example, in order to drive the servomotors for drive 3-A1 and 3-A2, inverters for drive 15-A1 and 15-A2, a converter 14-A, and an inverter for buffer 13-A are connected through a DC link 4-A to the same, while, in order to drive the servomotor for drive 3-B, an inverter for drive 15-B, a converter 14-B, and an inverter for buffer 13-B are connected through a DC link 4-B to the same. Note that the number of the DC links 4-A and 4-B is two, but the number of the DC links is not to be particularly limited to two as illustrated in FIG. 1 and may be two or more. Further, the number of the servomotors for drive connected to the respective DC links is not to be particularly limited to three as illustrated in FIG. 1 and may be two or more. Still further, the number of the servomotors for drive in each of the DC links may be the same or different. In addition, since to the DC links 4-A and 4-B, the converters 14-A and 14-B are respectively connected in a single manner, the number of the DC links corresponds to the number of the converters. Further, the number of phases of the power supply 2, the servomotors for drive 3-A1, 3-A2, and 3-B, and the servomotor for buffer 12 is not to particularly limit the present embodiment and may be, for example, three or one. Herein, by way of example, the number of phases of the power supply 2, the servomotors for drive 3-A1, 3-A2, and 3-B, and the servomotor for buffer 12 is each three. Still further, also a type of the servomotors for drive 3-A1, 3-A2, and 3-B, and the servomotor for buffer 12 is not to particularly limit the present embodiment and may be, for example, an induction motor or a synchronous motor. Herein, examples of a machine to which the servomotors for drive 3-A1, 3-A2, and 3-B are provided may include a machine tool, a robot, a forming machinery, an injection molding machine, an industrial machinery, various types of electrical products, a train, a vehicle, a flying machine, etc.

As illustrated in FIG. 1, the motor drive system 1 according to the first embodiment includes a flywheel 11, the servomotor for buffer 12, the inverters for buffer 13-A and 13-B, the converters 14-A and 14-B, the inverters for drive 15-A1, 15-A2, and 15-B, a motor control unit for buffer 16, a power consumption amount calculation unit 17, a power storage power supply amount calculation unit 18, a torque limit value calculation unit 19, and a comparison unit 20. Further, similarly to typical motor drive systems, the motor drive system 1 includes a motor control unit for drive 21 for controlling the inverters for drive 15-A1, 15-A2, and 15-B.

First, each circuit constitutional element of the motor drive system 1 according to the first embodiment will be described.

The inverters for drive 15-A1, 15-A2, and 15-B are respectively provided to the servomotors for drive 3-A1, 3-A2, and 3-B. The inverters for drive 15-A1 and 15-A2 are connected to the DC link 4-A, and the inverter for drive 15-B is connected to the DC link 4-B. The inverters for drive 15-A1, 15-A2, and 15-B constitute servo amplifiers which convert a DC power in the DC links 4-A and 4-B to an AC power and output the same as a drive power of the servomotors for drive 3-A1, 3-A2, and 3-B, respectively. In general, the servomotor for drive is provided with one or more windings, and in order to drive the servomotor for drive, one inverter for drive 15-A1, 15-A2, or 15-B per winding in the servomotor for drive 3-A1, 3-A2, or 3-B, respectively, is necessary. In FIG. 1, to clarify the illustration, by way of example, the servomotors for drive 3-A1, 3-A2, and 3-B are of a one-winding type and accordingly, to the servomotors for drive 3-A1, 3-A2, and 3-B, the inverters for drive 15-A1, 15-A2, and 15-B are connected, respectively.

Each of the inverters for drive 15-A1, 15-A2, and 15-B is composed of a bridge circuit of a switching element and a diode connected in antiparallel to the same, and each switching element is controlled to be turned on/off, for example, on the basis of a PWM switching control of a triangular wave comparison method. Each of the inverters for drive 15-A1, 15-A2, and 15-B is composed of a three-phase bridge circuit when the servomotors for drive 3-A1, 3-A2, and 3-B are a three-phase motor and composed of a single-phase bridge circuit when the servomotors for drive 3-A1, 3-A2, and 3-B are a single-phase motor. Examples of the switching element may include a unipolar transistor, such as a field effect transistor (FET), a bipolar transistor, an insulated gate bipolar transistor (IGBT), a thyristor, a gate turn-off thyristor (GTO), etc., but the type of switching element is not limited to the present embodiment, and other switching elements may be employed.

Each of the inverters for drive 15-A1, 15-A2, and 15-B performs power conversion between a DC power in the DC links 4-A and 4-B and an AC power which is a drive power or a regenerative power of the servomotor for drive 3 through an on/off control of each switching element on the basis of a drive command received from a servomotor control unit for drive 21 as described below. Further in detail, the inverters for drive 15-A1, 15-A2 allow the internal switching element to perform a switching operation on the basis of a drive command received from the servomotor control unit for drive 21, and convert a DC power supplied from the converter 14-A through the DC link 4-A to an AC power having a desirable voltage and a desirable frequency for driving the servomotors for drive 3-A1 and 3-A2 (inversion operation). Accordingly, each of the servomotors for drive 3-A1 and 3-A2 is configured to operate, for example, on the basis of an AC power having a variable voltage and a variable frequency. Further, while a regenerative power is sometimes generated during deceleration of each of the servomotors for drive 3-A1 and 3-A2, the internal switching element is allowed to perform a switching operation on the basis of a drive command received from the servomotor control unit for drive 21, and an AC regenerative power generated in the servomotors for drive 3-A1 and 3-A2 is converted to a DC power and returned to the DC link 4-A (conversion operation). Similarly, the inverter for drive 15-B allows the internal switching element to perform a switching operation on the basis of a drive command received from the servomotor control unit for drive 21, and converts a DC power supplied from the converter 14-B through the DC link 4-B to an AC power having a desirable voltage and a desirable frequency for driving the servomotor for drive 3-B (inversion operation). Accordingly, the servomotor for drive 3-B is configured to operate, for example, on the basis of an AC power having a variable voltage and a variable frequency. Further, while a regenerative power is sometimes generated during deceleration of each servomotor for drive 3-B, the internal switching element is allowed to perform a switching operation on the basis of a drive command received from the servomotor control unit for drive 21, and an AC regenerative power generated in the servomotor for drive 3-B is converted to a DC power and returned to the DC link 4-B (conversion operation).

The motor control unit for drive 21 controls the inverter for drive 15-A1, the inverter for drive 15-A2, and the inverter for drive 15-B. On the basis of a speed (speed feedback) of a (rotor) of each of the servomotors for drive 3-A1, 3-A2, and 3-B detected by a speed detection device 31 (speed feedback), a current flowing through a winding of the servomotors for drive 3-A1, 3-A2, and 3-B (current feedback), a certain torque command, an operation program of the servomotors for drive 3-A1, 3-A2, and 3-B, etc., the motor control unit for drive 21 generates respective drive commands for controlling a speed or torque of the servomotors for drive 3-A1, 3-A2, and 3-B or a position of a rotor. On the basis of the drive command generated by the motor control unit for drive 21, each power conversion operation by the inverters for drive 15-A1, 15-A2, and 15-B is controlled. Note that a configuration of the motor control unit for drive 21 defined herein is merely illustrative, and the configuration of the motor control unit for drive 21 may be also specified by including terms, such as a position command creation unit, a torque command creation unit, and a switching command creation unit.

The converters 14-A and 14-B are converters which are connected to the DC links 4-A and 4-B, respectively, and perform power conversion between an AC power at a power supply 2 side and a DC power in the DC links 4-A and 4-B, respectively. The converters 14-A and 14-B are composed of a three-phase bridge circuit when a three-phase AC is supplied from the power supply 2 and composed of a single-phase bridge circuit when a single-phase AC is supplied from the power supply 2. The converters 14-A and 14-B are realized as a power conversion device capable of AC-DC bidirectional conversion which converts an AC power inputted from the power supply 2 side to a DC power and outputs the same to a DC side and, during power regeneration, converts a DC power in the DC links 4-A and 4-B to an AC power and outputs the same to the power supply 2 side, such as a 120-degree conduction type rectifier circuit and a PWM switching control type rectifier circuit. For example, when being a PWM switching control type rectifier circuit, the converters 14-A and 14-B are composed of a bridge circuit of a switching element and a diode connected in antiparallel to the same, and performs AC-DC bidirectional power conversion through an on/off control of each switching element in accordance with a drive command received from an upper-level control device (unillustrated). Examples of the switching element may include a unipolar transistor, such as a FET, a bipolar transistor, an IGBT, a thyristor, a GTO, etc., but the type of switching element is not limited to the present embodiment, and other switching elements may be employed.

With respect to each of the converters 14-A and 14-B, as a maximum power amount within which power conversion from an AC power to a DC power is possible and a maximum power amount within which power conversion from a DC power to an AC power is possible, a "maximum power conversion amount" is specified. The maximum power conversion amount is generally specified as specification data on a conversion capacity of the converters 14-A and 14-B and is indicated, for example, in a specification table or an instruction manual of the converters 14-A and 14-B.

Thus, to the DC link 4-A, the inverters for drive 15-A1 and 15-A2 and the converter 14-A are connected in order to drive the servomotors for drive 3-A1 and 3-A2, and to the DC link 4-B, the inverter for drive 15-B and the converter 14-B are connected in order to drive the servomotor for drive 3-B. In addition, the DC links 4-A and 4-B are provided with a DC link capacitor (also referred to as smoothing capacitor), illustration of which is, however, omitted. The DC link capacitor has a function of storing a DC power in the DC links 4-A and 4-B and a function of restraining a ripple portion of a DC output of the converters 14-A and 14-B.

In order that the servomotors for drive 3-A1, 3-A2, and 3-B can be driven by an output exceeding the maximum power conversion amount of the converters 14-A and 14-B, the motor drive system 1 is provided with a flywheel type power storage device 10. The power storage device 10 includes the flywheel 11, the servomotor for buffer 12, and the inverters for buffer 13-A and 13-B.

The flywheel 11 is configured to be capable of storing a rotation energy and also referred to as inertial body.

The servomotor for buffer 12 is configured to allow the flywheel 11 to rotate, and the flywheel 11 is connected to a rotation shaft of the servomotor for buffer 12. Allowing the servomotor for buffer 12 to rotate enables storage of a rotation energy in the flywheel 11. The servomotor for buffer 12 includes a plurality of independent windings. In FIG. 1, by way of example, the servomotor for buffer 12 is of a two-winding type. Further, to the independent windings of the servomotor for buffer 12, the inverter for buffer (two pieces in the example of FIG. 1) is respectively provided. A further detailed description will be made in the following.

Figure 2A:
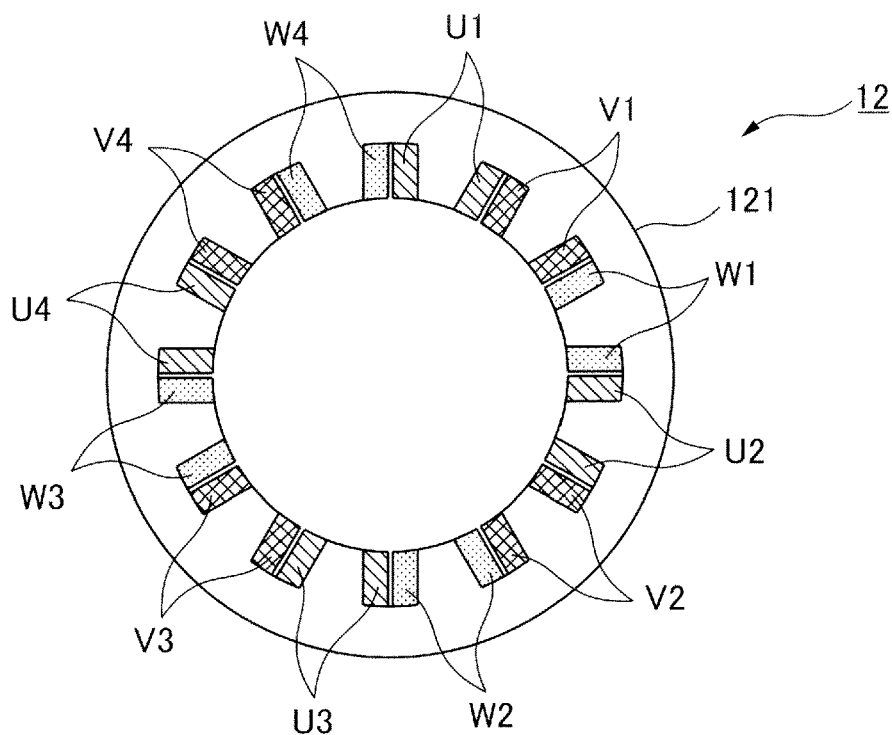
FIG. 2A is a diagram illustrating a servomotor for buffer including a plurality of independent windings, and is a cross-sectional view illustrating a winding structure of the servomotor for buffer.
Figure 2B:
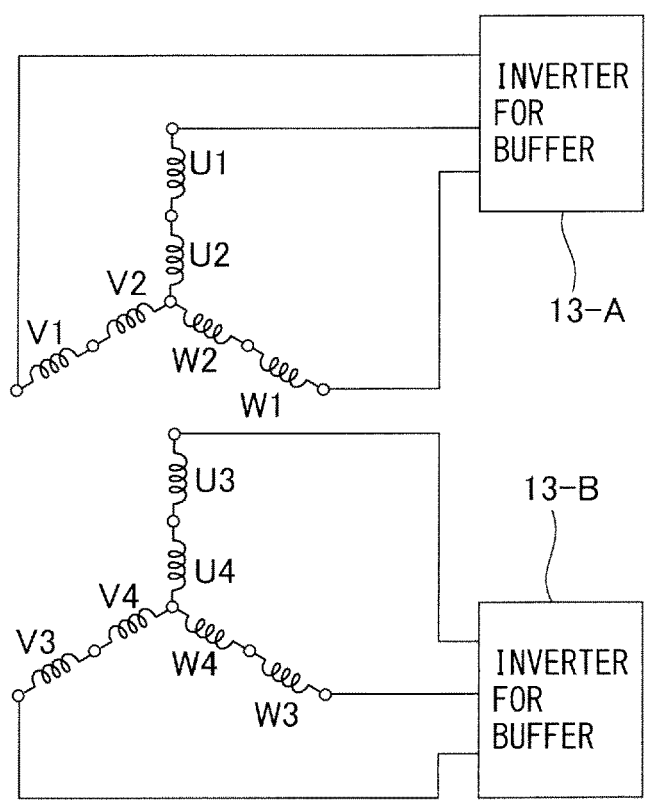
FIG. 2B is a diagram illustrating the servomotor for buffer including the plurality of independent windings, and is a circuit diagram illustrating a connection relationship between the servomotor for buffer and an inverter for buffer.

FIG. 2A is a diagram illustrating a servomotor for buffer including a plurality of independent windings, and is a cross-sectional view illustrating a winding structure of the servomotor for buffer. FIG. 2B is a diagram illustrating the servomotor for buffer including the plurality of independent windings, and is a circuit diagram illustrating a connection relationship between the servomotor for buffer and an inverter for buffer. In FIG. 2A, by way of example, there is illustrated the two-winding type servomotor for buffer 12. A stator 121 of the servomotor for buffer 12 is provided with a plurality of windings (U1, U2, V1, V2, W1, W2, U3, U4, V3, V4, W3, W4), and in a case of a two-winding type, the plurality of windings (U1, U2, V1, V2, W1, W2, U3, U4, V3, V4, W3, W4) are divided into one set of the windings (U1, U2, V1, V2, W1, W2) and the other set of the windings (U3, U4, V3, V4, W3, W4). Further, in order to drive the servomotor for buffer 12 including the plurality of independent windings, the windings are respectively provided to the inverters for buffer 13-A and 13-B. In other words, as illustrated in FIG. 2B, from the above plurality of windings, one set of the windings (U1, U2, V1, V2, W1, W2) is connected to one inverter for buffer 13-A, while from the above plurality of windings, the other set of the windings (U3, U4, V3, V4, W3, W4) is connected to the other inverter for buffer 13-B. Thus, the inverters for buffer 13-A and 13-B are respectively provided to the independent windings of the servomotor for buffer 12. In FIGS. 2A and 2B, the servomotor for buffer 12 is of a two-winding type, and accordingly the number of the inverters for buffer 13-A and 13-B provided is two. For example, if the servomotor for buffer is of a three-winding type, three inverters for buffer are provided, and if the servomotor for buffer is of a four-winding type, four inverters for buffer are provided.

Thus, the inverters for buffer 13-A and 13-B are respectively provided to the independent windings of the servomotor for buffer 12. The inverter for buffer 13-A performs power conversion between an AC power which is a drive power or a regenerative power of the servomotor for buffer 12 and a DC power in the DC link 4-A to which the inverter for buffer 13-A is connected through an on/off control of each switching element in accordance with a drive command received from the motor control unit for buffer 16. Further, the inverter for buffer 13-B performs power conversion between an AC power which is a drive power or a regenerative power of the servomotor for buffer 12 and a DC power in the DC link 4-B to which the inverter for buffer 13-B is connected through an on/off control of each switching element in accordance with a drive command received from the motor control unit for buffer 16.

The inverters for buffer 13-A and 13-B are composed of a bridge circuit of a switching element and a diode connected in antiparallel to the same. The inverters for buffer 13-A and 13-B are composed of a three-phase bridge circuit when the servomotor for buffer 12 is a three-phase motor and composed of a single-phase bridge circuit when the servomotor for buffer 12 is a single-phase motor. Examples of the switching element may include a unipolar transistor, such as a FET, a bipolar transistor, an IGBT, a thyristor, a GTO, etc., but the type of switching element is not limited to the present embodiment, and other switching elements may be employed. For example, on the basis of a PWM switching signal obtained by comparing a received drive command with a triangular wave carrier, each switching element in the inverters for buffer 13-A and 13-B is controlled to be turned on/off.

The motor control unit for buffer 16 controls power conversion of the inverters for buffer 13-A and 13-B, whereby the servomotor for buffer 12 to which the flywheel 11 is connected rotates while accelerating or decelerating, or rotates at a constant speed, conversion between a rotation energy of the flywheel 11 and an electrical energy in the DC links 4-A and 4-B is made, and a DC power amount to be stored or supplied by the power storage device 10 (a DC power amount transferred by the power storage device 10 with respect to the DC links 4-A and 4-B) is adjusted. A further detailed description of storage and supply of a DC power by the power storage device 10 will be made in the following.

When the inverters for buffer 13-A and 13-B perform an inversion operation to convert a DC power in the DC links 4-A and 4-B to an AC power on the basis of a drive command received from the motor control unit for buffer 16, an electrical energy from the DC links 4-A and 4-B is taken in to a servomotor for buffer 12 side, and this electrical energy allows the servomotor for buffer 12 to which the flywheel 11 is connected to rotate. Thus, in the flywheel type power storage device 10, an electrical energy flowing from the DC links 4-A and 4-B into the same is converted to a rotation energy of the flywheel 11 and stored. Further, the inverters for buffer 13-A and 13-B generate an AC regenerative power by deceleration of the servomotor for buffer 12 to which the flywheel 11 is connected and performs a conversion operation to convert this AC power to a DC power on the basis of a drive command received from the motor control unit for buffer 16, whereby a rotation energy stored in the flywheel 11 is converted to an electrical energy and supplied to the DC links 4-A and 4-B.

Figure 3:
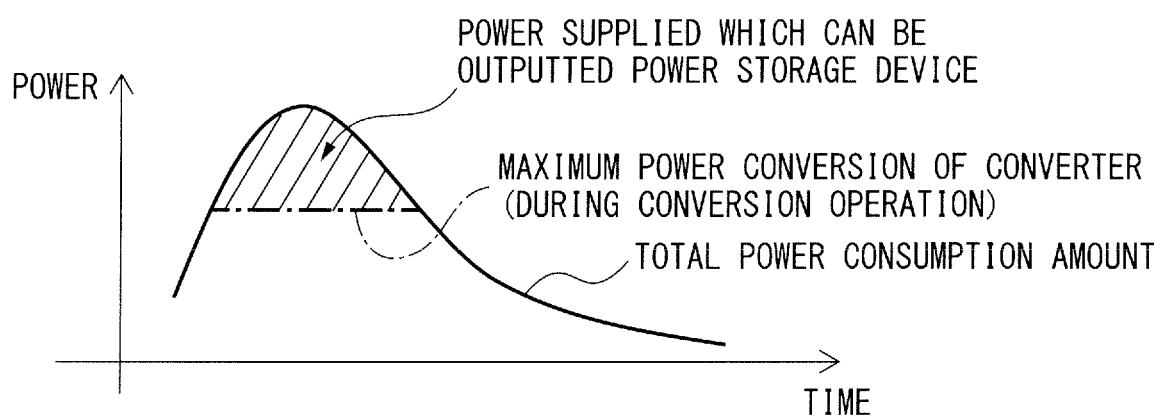
FIG. 3 is a diagram illustrating a relationship between a DC power supplied from a power storage device and a DC power supplied from converters in the motor drive system.

In the motor drive system 1, for example, during acceleration of the servomotors for drive 3-A1, 3-A2, and 3-B, in addition to an energy supplied from the converter 14-A, an energy stored in the power storage device 10 is supplied through the DC links 4-A and 4-B to the servomotors for drive 3-A1, 3-A2, and 3-B and used as a power for acceleration of the servomotors for drive 3-A1, 3-A2, and 3-B. FIG. 3 is a diagram illustrating a relationship between a DC power supplied from a power storage device and a DC power supplied from converters in the motor drive system. A power supplied from the converter 14-A to the DC link 4-A is consumed as a drive power of the servomotors for drive 3-A1 and 3-A2 (to which, in other words, an output of the servomotors for drive 3-A1 and 3-A2 corresponds) and also as a winding loss at the servomotors for drive 3-A1 and 3-A2, a loss at the converter 14-A, and a loss at the inverters for drive 15-A1 and 15-A2. Further, a power supplied from the converter 14-B to the DC link 4-B is consumed as a drive power of the servomotor for drive 3-B (to which, in other words, an output of the servomotor for drive 3-B corresponds) and also as a winding loss at the servomotor for drive 3-B, a loss at the converter 14-B, and a loss at the inverter for drive 15-B. Herein, a sum total of powers consumed at the servomotors for drive 3-A1, 3-A2, and 3-B, the inverters for drive 15-A1, 15-A2, and 15-B, and the converters 14-A and 14-B is referred to as "total power consumption", which is indicated by the solid line in FIG. 3. Still further, the alternate long and short dash line indicates the maximum power conversion amount in a conversion operation of the converters 14-A and 14-B. As illustrated in FIG. 3, when during acceleration of the servomotors for drive 3-A1, 3-A2, and/or 3-B, from the total power consumption, a portion exceeding a maximum power supply of the converters 14-A and/or 14-B (region indicated by oblique lines in the figure) can be compensated by a DC power outputted (supplied) from the power storage device 10 to the DC links 4-A and/or 4-B, a power peak can be decreased. Further, although unillustrated in FIG. 3, when during deceleration of the servomotors for drive 3-A1, 3-A2, and/or 3-B, from an energy regenerated from the servomotors for drive 3-A1, 3-A2, and/or 3-B, a portion which fails to be returned by the converters 14-A and/or 14-B to the power supply 2 side can be taken in (stored) by the power storage device 10, a power peak can be decreased. Thus, an energy stored in the power storage device 10 can be reused together with a power supplied by the converter 14-B to drive the servomotor for drive 3-B so that the servomotor for drive 3-B can be driven by an output exceeding the maximum power conversion amount of the converter 14-B and a power peak can be decreased. Due to a decrease of the power peak, a capacity of the power supply 2 and operation costs of the motor drive system 1 can be decreased and a power failure and flicker at the power supply 2 side can be avoided.

In the present embodiment, the power consumption amount calculation unit 17 and the power storage power supply amount calculation unit 18 calculate various types of power amounts and on the basis of such a calculation result, driving of the servomotor for buffer 12 is controlled so as to adjust a DC power amount to be stored or supplied by the power storage device 10.

The power consumption amount calculation unit 17 calculates, with respect to each of the DC links 4-A and 4-B, a total power consumption amount consumed or regenerated when the servomotors for drive 3-A1, 3-A2, and 3-B are driven. The total power consumption amount includes a "power consumption amount of the servomotors for drive" and a "regenerative power amount of the servomotors for drive" as an "output of the servomotors for drive". A further specific description will be made as follows. In other words, the power consumption amount calculation unit 17 calculates, with respect to the DC link 4-A, the total power consumption amount obtained as a sum of a loss at the converter 14-A and the inverters for drive 15-A1 and 15-A2 which are connected to the DC link 4-A and an output of and a winding loss at the servomotors for drive 3-A1 and 3-A2 connected to the DC link 4-A respectively through the inverters for drive 15-A1 and 15-A2. Further, the power consumption amount calculation unit 17 calculates, with respect to the DC link 4-B, the total power consumption amount obtained as a sum of a loss at the converter 14-B and the inverter for drive 15-B which are connected to the DC link 4-B and an output of and a winding loss at the servomotor for drive 3-B connected to the DC link 4-B through the inverter for drive 15-B.

The power storage power supply capacity amount calculation unit 18 calculates a power storage power supply capacity amount with respect to each of the inverters for buffer 13-A and 13-B. In other words, the power storage power supply capacity amount calculation unit 18 calculates, with respect to the inverter for buffer 13-A, a power storage power supply capacity amount defined as a DC power amount which can be taken in from the DC link 4-A or outputted to the DC link 4-A by the inverter for buffer 13-A on the basis of the total power consumption amount calculated by the power consumption amount calculation unit 17 with respect to the DC link 4-A and a maximum power conversion amount defined as a maximum power amount within which power conversion by the converter 14-A is possible. Further, the power storage power supply capacity amount calculation unit 18 calculates, with respect to the inverter for buffer 13-B, a power storage power supply capacity amount defined as a DC power amount which can be taken in from the DC link 4-B or outputted to the DC link 4-B by the inverter for buffer 13-B on the basis of the total power consumption amount calculated by the power consumption amount calculation unit 17 with respect to the DC link 4-B and a maximum power conversion amount defined as a maximum power amount within which power conversion by the converter 14-B is possible. Note that in the present embodiment, the power storage power supply capacity amount calculated by the power storage power supply capacity amount calculation unit 18 is merely to indicate a power amount which "can be taken in from the DC links" or "can be outputted to the DC links" and may be different from a power amount which "is actually taken in from the DC links" or "is actually outputted to the DC links" depending on a content of a control of the motor control unit for buffer 16 as described below.

The torque limit value calculation unit 19 calculates a torque limit value with respect to the servomotor for buffer 12 on the basis of the power storage power supply capacity amount calculated by the power storage power supply capacity amount calculation unit 18 and a rotation speed of the servomotor for buffer 12 detected by a speed detection device 32. The torque limit value is set with respect to a torque command to the servomotor for buffer 12 and will be later described in detail.

The comparison unit 20 compares a magnitude of an absolute value of a sum total of the power storage power supply capacity amounts for indicating a DC power amount which can be taken in from the DC links 4-A and 4-B by the inverters for buffer 13-A and 13-B and a magnitude of an absolute value of a sum total of the power storage power supply capacity amounts for indicating a DC power amount which can be outputted to the DC links 4-A and 4-B by the inverters for buffer 13-A and 13-B. Details of a comparison process by the comparison unit 20 will be later described.

The motor control unit for buffer 16 controls driving of the servomotor for buffer 12 and adjusts a DC power amount to be stored or supplied by the power storage device 10 by outputting a drive command respectively to the inverters for buffer 13-A and 13-B connected to the respective windings on the basis of the power storage power supply capacity amount calculated by the power storage power supply capacity amount calculation unit 18 so as to control power conversion, respectively. In response to the received drive command, the inverters for buffer 13-A and 13-B perform an inversion operation (power operation) to convert a DC power in the DC links 4-A and 4-B to an AC power and supply the same to the servomotor for buffer 12 or a conversion operation (regeneration operation) to convert an AC power regenerated from the servomotor for buffer 12 to a DC power and return the same to the DC links 4-A and 4-B. In the first embodiment, the motor control units for buffer 16 perform, with respect to each of the inverters for buffer 13-A and 13-B, a torque control with respect to the servomotor for buffer 12 while changing an upper limit value and a lower limit value of a torque command using the torque limit value calculated by the torque limit value calculation unit 19 so as to adjust a DC power amount stored from the DC links 4-A and 4-B or supplied to the DC links 4-A and 4-B by the inverters for buffer 13-A and 13-B, respectively. Details of a control of each of the inverters for buffer 13-A and 13-B by the motor control unit for buffer 16 will be later described.

Subsequently, the torque control using a torque limit value and the comparison process by the comparison unit according to the first embodiment will be described further in detail.

As described above, power storage of the flywheel type power storage device 10 is realized by storing an electrical energy taken in to the servomotor for buffer 12 side from the DC links 4-A and 4-B through a conversion operation (inversion) from a DC power to an AC power by the inverters for buffer 13-A and 13-B as a rotation energy of the servomotor for buffer 12 to which the flywheel 11 is connected. Further, power supply of the flywheel type power storage device 10 is realized by allowing an AC regenerative power to be generated by deceleration of the servomotor for buffer 12 to which the flywheel 11 is connected, converting a rotation energy stored in the flywheel 11 to an electrical energy through a conversion operation (conversion) from an AC power to a DC power by the inverters for buffer 13-A and 13-B, and supplying the same to the DC links 4-A and 4-B. In other words, to a DC power amount stored from the DC links 4-A and 4-B or supplied to the DC links 4-A and 4-B by the power storage device 10, an output of the servomotor for buffer 12 in the power storage device 10 corresponds.

In general, an output of a servomotor is expressed on the basis of a rotation speed (rotation angular velocity) of the servomotor and a torque of the servomotor as Equation 1:

$$\text{Output of servomotor [W]} = \text{rotation speed [rad/s]} \times \text{torque [Nm]} \quad (1)$$

The above Equation 1 also holds with respect to the servomotor for buffer 12. When Equation 1 is transformed in terms of the servomotor for buffer 12, Equation 2 is obtained.

Torque of servomotor for buffer 12 [Nm]=output of servomotor for buffer 12 [W]/rotation speed of servomotor for buffer 12 [rad/s]   (2)

As described above, to a DC power amount stored from the DC links 4-A and 4-B or supplied to the DC links 4-A and 4-B by the power storage device 10, an output of the servomotor for buffer 12 in the power storage device 10 corresponds. Then, in the present embodiment, a torque control is performed using a torque of the servomotor for buffer 12 expressed by Equation 2 as a torque limit value with respect to a torque command so as to adjust a DC power amount stored from the DC links 4-A and 4-B or supplied to the DC links 4-A and 4-B by the power storage device 10.

Figure 4:
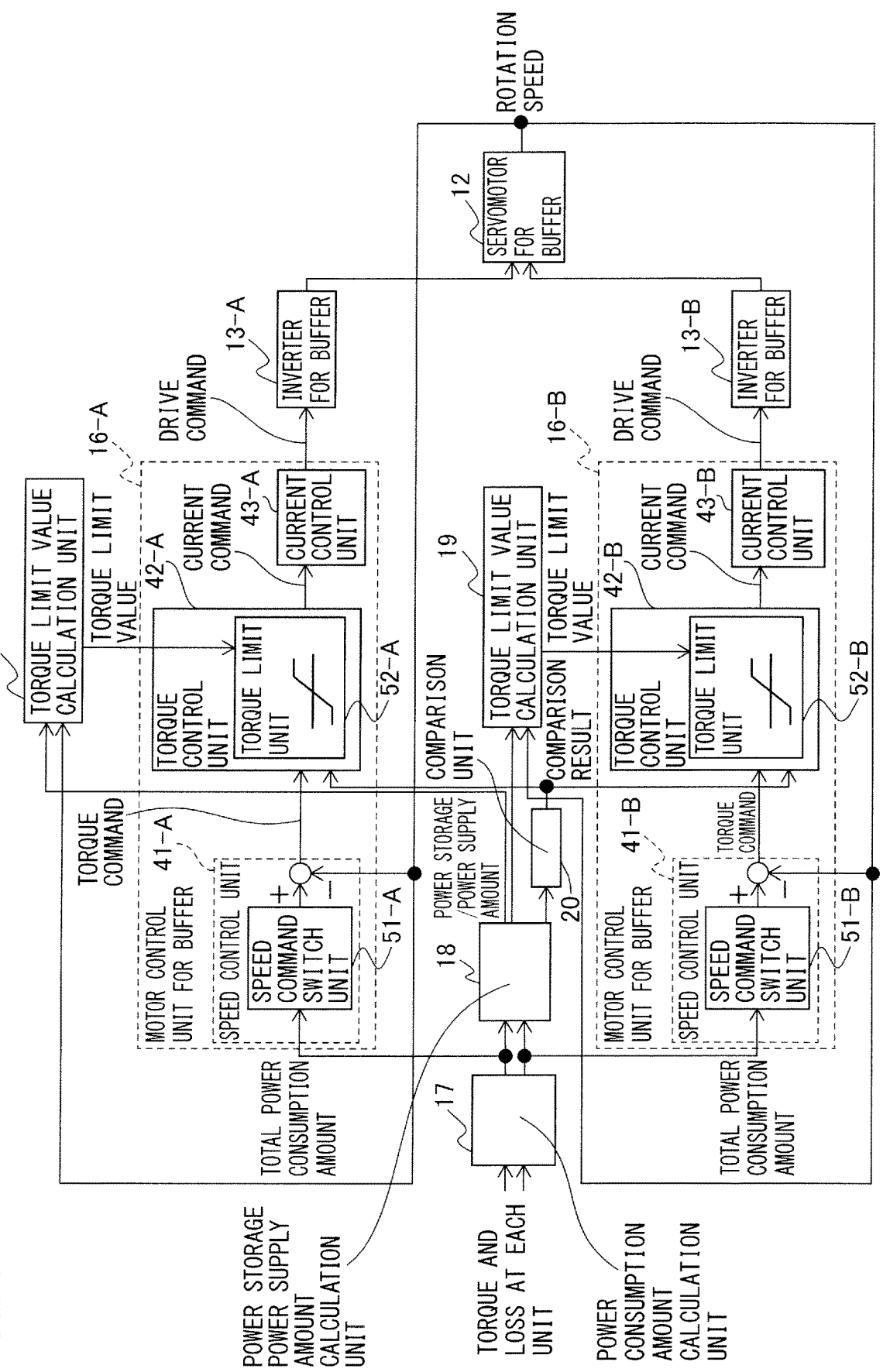
FIG. 4 is a block diagram illustrating a control loop with respect to the servomotor for buffer in the power storage device in the motor drive system according to the first embodiment.

FIG. 4 is a block diagram illustrating a control loop with respect to the servomotor for buffer in the power storage device in the motor drive system according to the first embodiment. To the motor control unit for buffer 16 of FIG. 1, motor control units for buffer 16-A and 16-B correspond in FIG. 4. As illustrated in FIG. 4, the motor control unit for buffer 16-A includes a speed control unit 41-A which performs a speed feedback control to allow a rotation speed of the servomotor for buffer 12 to follow a speed command, a torque control unit 42-A which performs a torque control using a torque command generated by the speed control unit 41-A and a torque limit value with respect to the inverter for buffer 13-A calculated by the torque limit value calculation unit 19, and a current control unit 43-A which performs a current control on the basis of a current command generated by the torque control unit 42-A. Further, the motor control unit for buffer 16-B includes a speed control unit 41-B which performs a speed feedback control to allow a rotation speed of the servomotor for buffer 12 to follow a speed command, a torque control unit 42-B which performs a torque control using a torque command generated by the speed control unit 41-B and a torque limit value with respect to the inverter for buffer 13-B calculated by the torque limit value calculation unit 19, and a current control unit 43-B which performs a current control on the basis of a current command generated by the torque control unit 42-B.

The power consumption amount calculation unit 17 calculates, with respect to the DC link 4-A, the total power consumption amount obtained as a sum of a loss at the converter 14-A and the inverters for drive 15-A1 and 15-A2 which are connected to the DC link 4-A and an output of and a winding loss at the servomotors for drive 3-A1 and 3-A2 connected to the DC link 4-A respectively through the inverters for drive 15-A1 and 15-A2. Further, the power consumption amount calculation unit 17 calculates, with respect to the DC link 4-B, the total power consumption amount obtained as a sum of a loss at the converter 14-B and the inverter for drive 15-B which are connected to the DC link 4-B and an output of and a winding loss at the servomotor for drive 3-B connected to the DC link 4-B through the inverter for drive 15-B. Herein, an output of the servomotor for drive 3-A1 is obtained in accordance with Equation 1 from a multiplication of a rotation speed of the servomotor for drive 3-A1 detected by the speed detection device 31 and a torque of the servomotor for drive 3. An output of the servomotor for drive 3-A2 is obtained in accordance with Equation 1 from a multiplication of a rotation speed of the servomotor for drive 3-A2 detected by the speed detection device 31 and a torque of the servomotor for drive 3. An output of the servomotor for drive 3-B is obtained in accordance with Equation 1 from a multiplication of a rotation speed of the servomotor for drive 3-B detected by the speed detection device 31 and a torque of the servomotor for drive 3.

For example, when the servomotor for drive 3-A1 is accelerated, the servomotor for drive 3-A1 consumes an AC power individually supplied from the inverter for drive 15-A1, and an output of the servomotor for drive 3-A1 during such a power consumption is set to be "positive". Accordingly, when a power is regenerated due to deceleration of the servomotor for drive 3-A1, an output of the servomotor for drive 3-A1 is set to be "negative". A similar relationship is also applied to the servomotor for drive 3-A2 and the inverter for drive 15-A2, and the servomotor for drive 3-B and the inverter for drive 15-B.

With respect to the DC link 4-A, because, usually, a loss at the converter 14-A and the inverters for drive 15-A1 and 15-A2 and a winding loss at the servomotors for drive 3-A1 and 3-A2 are smaller than an absolute value of an output of the servomotors for drive 3-A1 and 3-A2, an influence of an output of the servomotors for drive 3-A1 and 3-A2 on the total power consumption amount is dominant. Thus, the positive/negative of the total power consumption amount with respect to the DC link 4-A calculated by the power consumption amount calculation unit 17 substantially corresponds to the positive/negative (consumption or regeneration) of an output of the servomotors for drive 3-A1 and 3-A2. Similarly, the positive/negative of the total power consumption amount with respect to the DC link 4-B calculated by the power consumption amount calculation unit 17 substantially corresponds to the positive/negative (consumption or regeneration) of an output of the servomotor for drive 3-B.

Note that, with respect to the DC link 4-A, because there also exists a loss also at the inverter for buffer 13-A, the power consumption amount calculation unit 17 may calculate, as the total power consumption amount, a further addition of a loss at the inverter for buffer 13-A to a sum of a loss at the converter 14-A, a loss at the inverters for drive 15-A1 and 15-A2, and a winding loss at the servomotors for drive 3-A1 and 3-A2. Similarly, with respect to the DC link 4-B, the power consumption amount calculation unit 17 may calculate, as the total power consumption amount, a further addition of a loss at the inverter for buffer 13-B to a sum of a loss at the converter 14-B, a loss at the inverter for drive 15-B, and a winding loss at the servomotor for drive 3-B.

The power storage power supply amount calculation unit 18 calculates the power storage power supply capacity amount with respect to each of the inverters for buffer 13-A and 13-B. Further in detail, with respect to the inverter for buffer 13-A, the power storage power supply capacity amount calculation unit 18 calculates a difference between the maximum power conversion amount defined as a maximum power amount within which power conversion by the converter 14-A is possible and the total power consumption amount with respect to the DC link 4-A calculated by the power consumption amount calculation unit 17 (i.e. a value in which the total power consumption amount is subtracted from the maximum power conversion amount). A difference between the maximum power conversion amount of the converter 14-A and the total power consumption amount with respect to the DC link 4-A calculated by the power consumption amount calculation unit 17 corresponds to the "power storage power supply capacity amount" which is a DC power amount that can be taken in from the DC link 4-A or outputted to the DC link 4-A by the inverter for buffer 13-A. For example, when the "power storage power supply capacity amount" which is a difference between the maximum power conversion amount with respect to a conversion operation of the converter 14-A and the total power consumption amount with respect to the DC link 4-A calculated by the power consumption amount calculation unit 17 is negative, it is indicated that a total power consumption exceeds a maximum power supply during conversion of the converter 14-A, and in such a case, an, energy taken in from the power supply 2 side to the DC link 4-A by the converter 14-A fails to cover the entirety of the total power consumption amount, and accordingly, a shortage thereof is to be covered by an output from the inverter for buffer 13-A to the DC link 4-A. In other words, if the inverter for buffer 13-A can output the "power storage power supply capacity amount" which covers the above shortage to the DC link 4-A, it is possible to drive the servomotors for drive 3-A1 and/or 3-A2 within the maximum power conversion amount of the converter 14-A. Further, for example, when the "power storage power supply capacity amount" which is a difference between an absolute value of the maximum power conversion amount with respect to an inversion operation of the converter 14-A and an absolute value of the total power consumption amount with respect to the DC link 4-A calculated by the power consumption amount calculation unit 17 is negative, it is indicated that a total power consumption exceeds a maximum regenerative power during inversion of the converter 14-A, and in such a case, an energy returned from the DC link 4-A to the power supply 2 by the converter 14-A fails to recover an energy regenerated from the servomotors for drive 3-A1 and/or 3-A2, and accordingly, an exceeding portion thereof is to be covered by being taken in from the DC link 4-A by the inverter for buffer 13-A. In other words, if the inverter for buffer 13-A can take in the "power storage power supply capacity amount" which covers the above exceeding portion from the DC link 4-A, it is possible to drive the servomotors for drive 3-A1 and/or 3-A2 within the maximum power conversion amount of the converter 14-A. Note that with respect to the power storage power supply capacity amount, the inverter for buffer 13-A has been herein described, but the same can be also applied to the inverter for buffer 13-B.

Note that in general, there exists in a servomotor a drive efficiency (ratio of an output of the servomotor to a drive power supplied to the servomotor), and in consideration of a drive efficiency of the servomotor for buffer 12, the power storage power supply capacity amount may be calculated. In other words, for example, with respect to the inverter for buffer 13-A, the power storage power supply amount calculation unit 18 may calculate the power storage power supply capacity amount on the basis of the total power consumption amount with respect to the DC link 4-A calculated by the power consumption amount calculation unit 17, the maximum power conversion amount by the converter 14-A, and a drive efficiency of the servomotor for buffer 12. For example, when the power storage device 10 including the servomotor for buffer 12 having a drive efficiency of 90% supplies a DC power to the DC link 4-A, the power storage power supply amount calculation unit 18 may calculate, as the power storage power supply capacity amount with respect to the inverter for buffer 13-A (DC power amount which can be outputted to the DC link 4-A), a value obtained by further multiplying a difference between the maximum power conversion amount of the converter 14-A and the total power consumption amount calculated by the power consumption amount calculation unit 17 by "100/90". Further, when the power storage device 10 including the servomotor for buffer 12 having a drive efficiency of 90% stores a DC power from the DC link 4-A, the power storage power supply amount calculation unit 18 may calculate, as the power storage power supply capacity amount with respect to the inverter for buffer 13-A (DC power amount which can be taken in from the DC link 4-A), a value obtained by further multiplying a difference between the maximum power conversion amount of the converter 14-A and the total power consumption amount calculated by the power consumption amount calculation unit 17 by "90/100". The same can be also applied to the inverter for buffer 13-B.

The torque limit value calculation unit 19 calculates a torque limit value with respect to the servomotor for buffer 12 on the basis of the power storage power supply capacity amount calculated by the power storage power supply capacity amount calculation unit 18 and a rotation speed of the servomotor for buffer 12 detected by the speed detection device 32. A torque limit value is calculated with respect to each of the inverters for buffer 13-A and 13-B. As described above, to the power storage power supply capacity amount with respect to the inverter for buffer 13-A, a difference between the maximum power conversion amount of the converter 14-A and the total power consumption amount with respect to the DC link 4-A calculated by the power consumption amount calculation unit 17 corresponds. Further, to the power storage power supply capacity amount with respect to the inverter for buffer 13-A, an output of the servomotor for buffer 12 in the power storage device 10 corresponds. Then, the torque limit value calculation unit 19 calculates a torque limit value used in the motor control unit for buffer 16-A by dividing the power storage power supply capacity amount calculated by the power storage power supply amount calculation unit 18 which is a "difference between the maximum power conversion amount of the converter 14-A and the total power consumption amount with respect to the DC link 4-A calculated by the power consumption amount calculation unit 17" by a rotation speed of the servomotor for buffer 12 detected by the speed detection device 32. A torque limit value is employed in the torque control unit 42-A in the motor control unit for buffer 16-A as a torque limit value with respect to a torque command. Similarly, the torque limit value calculation unit 19 calculates a torque limit value used in the motor control unit for buffer 16-B by dividing the power storage power supply capacity amount calculated by the power storage power supply amount calculation unit 18 which is a "difference between the maximum power conversion amount of the converter 14-B and the total power consumption amount with respect to the DC link 4-B calculated by the power consumption amount calculation unit 17" by a rotation speed of the servomotor for buffer 12 detected by the speed detection device 32. A torque limit value is employed in a torque control unit 42-B in the motor control unit for buffer 16-B as a torque limit value with respect to a torque command. A torque control using a torque limit value is performed in accordance with a content of the power storage power supply capacity amount with respect to each of the inverters for buffer 13-A and 13-B, but details thereof will be later described.

In the motor control unit for buffer 16-A, the speed control unit 41-A performs a speed feedback control to allow a rotation speed of the servomotor for buffer 12 as a control target to follow a speed command set by a speed command switch unit 51-A. If a magnitude relationship between the maximum power conversion amount of the converter 14-A and the total power consumption amount with respect to the DC link 4-A calculated by the power consumption amount calculation unit 17 is determined (i.e. if the power storage power supply capacity amount is determined), it can be accordingly determined whether an energy is to be taken in from the DC link 4-A (a DC power is stored in the power storage device 10) by accelerating the servomotor for buffer 12 or an energy is to be outputted to the DC link 4-A (a DC power is supplied from the power storage device) by decelerating the servomotor for buffer 12. In the first embodiment, a supply threshold value which is a first threshold value is set to be the maximum power conversion amount with respect to a conversion operation in which the converter 14-A performs power conversion of an AC power to a DC power. Further, the power storage threshold value which is a second threshold value is set to be the maximum power conversion amount with respect to an inversion operation in which the converter 14-A performs power conversion of a DC power to an AC power. Similarly, in the motor control unit for buffer 16-B, the speed control unit 41-B performs a speed feedback control to allow a rotation speed of the servomotor for buffer 12 as a control target to follow a speed command set by a speed command switch unit 51-B. A supply threshold value which is the first threshold value is set to be the maximum power conversion amount with respect to a conversion operation in which the converter 14-B performs power conversion of an AC power to a DC power. Further, the power storage threshold value which is a second threshold value is set to be the maximum power conversion amount with respect to an inversion operation in which the converter 14-B performs power conversion of a DC power to an AC power. Note that the power storage threshold value is set to be a value smaller than the supply threshold value. Alternatively, in consideration of safety of the converters 14-A and 14-B, it is also possible that the supply threshold value is set to be a value smaller than the maximum power conversion amount with respect to a conversion operation and the power storage threshold value is set to be a value larger than the maximum power conversion amount with respect to an inversion operation.

The motor control unit for buffer 16-A controls power conversion of the inverter for buffer 13-A so that the servomotor for buffer 12 rotates at a rotation speed for power supply smaller than a predetermined base rotation speed when the total power consumption amount with respect to the DC link 4-A calculated by the power consumption amount calculation unit 17 exceeds the supply threshold value (first threshold value). Further, the motor control unit for buffer 16-A controls power conversion of the inverter for buffer 13-A so that the servomotor for buffer 12 rotates at a rotation speed for power storage larger than the base rotation speed when the total power consumption amount with respect to the DC link 4-A calculated by the power consumption amount calculation unit 17 falls below the power storage threshold value (second threshold value). In addition, the motor control unit for buffer 16-A controls power conversion of the inverter for buffer 13-A so that the servomotor for buffer 12 rotates at the base rotation speed when the total power consumption amount with respect to the DC link 4-A calculated by the power consumption amount calculation unit 17 falls between the supply threshold value (first threshold value) and the power storage threshold value (second threshold value). Thus, in the first embodiment, the speed command switch unit 51-A in the motor control unit for buffer 16-A outputs a speed command for supply as a speed command so as to allow the servomotor for buffer 12 to rotate at the rotation speed for power supply when the total power consumption amount with respect to the DC link 4-A calculated by the power consumption amount calculation unit 17 exceeds the supply threshold value (first threshold value). Further, the speed command switch unit 51-A in the motor control unit for buffer 16-A outputs a speed command for power storage as a speed command so as to allow the servomotor for buffer 12 to rotate at the rotation speed for power storage when the total power consumption amount with respect to the DC link 4-A calculated by the power consumption amount calculation unit 17 falls below the power storage threshold value (second threshold value). Still further, the speed command switch unit 51-A in the motor control unit for buffer 16-A outputs a speed command for base as a speed command so as to allow the servomotor for buffer 12 to rotate at the base rotation speed when the total power consumption amount with respect to the DC link 4-A calculated by the power consumption amount calculation unit 17 falls between the supply threshold value (first threshold value) and the power storage threshold value (second threshold value). Similarly, also in the motor control unit for buffer 16-B, a speed command switch unit 51-B outputs the speed command for supply as a speed command so as to allow the servomotor for buffer 12 to rotate at the rotation speed for power supply when the total power consumption amount with respect to the DC link 4-B calculated by the power consumption amount calculation unit 17 exceeds the supply threshold value (first threshold value). Further, the speed command switch unit 51-B in the motor control unit for buffer 16-B outputs the speed command for power storage as a speed command so as to allow the servomotor for buffer 12 to rotate at the rotation speed for power storage when the total power consumption amount with respect to the DC link 4-B calculated by the power consumption amount calculation unit 17 falls below the power storage threshold value (second threshold value). Still further, the speed command switch unit 51-B in the motor control unit for buffer 16-B outputs the speed command for base as a speed command so as to allow the servomotor for buffer 12 to rotate at the base rotation speed when the total power consumption amount with respect to the DC link 4-B calculated by the power consumption amount calculation unit 17 falls between the supply threshold value (first threshold value) and the power storage threshold value (second threshold value).

Thus, in the first embodiment, a speed command set by the speed command switch units 51-A and 51-B is simplified into merely three types including the speed command for supply, the speed command for power storage, and the speed command for base so that a control is facilitated. Further, creating a speed command in accordance with an operation state and a power consumption of the servomotors for drive 3-A1, 3-A2, and 3-B is unnecessary, and a drive program of the servomotor for buffer 12 can be simplified. The speed command for supply, the speed command for power storage, and the speed command for base may be set to be a predetermined constant value. Alternatively, it is also possible that an output of the servomotors for drive 3-A1, 3-A2, and 3-B is measured in advance and from such a measurement result, a power necessary for power storage and power supply is calculated so as to determine the speed command for supply, the speed command for power storage, and the speed command for base.

The speed control unit 41-A in the motor control unit for buffer 16-A generates a torque command for allowing a rotation speed of the servomotor for buffer 12 to follow a speed command set by the speed command switch unit 51-A. The speed control unit 41-B in the motor control unit for buffer 16-B generates a torque command for allowing a rotation speed of the servomotor for buffer 12 to follow a speed command set by the speed command switch unit 51-B.

The motor control units for buffer 16-A and 16-B (or the motor control unit for buffer 16 in FIG. 1) perform with respect to the inverters for buffer 13-A and 13-B, respectively, a torque control with respect to the servomotor for buffer 12 while changing an upper limit value and a lower limit value of a torque command using a torque limit value calculated by the torque limit value calculation unit 19, and generates a current command value with respect to the inverters for buffer 13-A and 13-B, respectively. Thus, the torque control unit 42-A following the speed control unit 41-A includes a torque limit unit 52-A as a limiter to limit a torque command using a torque limit value. Further, the torque control unit 42-B following the speed control unit 41-B includes a torque limit unit 52-B as a limiter to limit a torque command using a torque limit value.

As described above, when the total power consumption amount with respect to the DC link 4-A calculated by the power consumption amount calculation unit 17 exceeds the supply threshold value (first threshold value), the motor control unit for buffer 16-A performs switching from the speed command for base to allow the servomotor for buffer 12 to rotate at the base rotation speed to the speed command for supply to allow the same to rotate at the rotation speed for power supply. In such a case, the torque limit value calculation unit 19 calculates a torque limit value with respect to the servomotor for buffer 12 using the below Equation 3. The same is also applied to a case in which the total power consumption amount with respect to the DC link 4-B calculated by the power consumption amount calculation unit 17 exceeds the supply threshold value (first threshold value). Note that in Equation 3, an absolute value of a value in which the total power consumption amount is subtracted from the supply threshold value represents the power storage power supply capacity amount. The torque limit value calculated in accordance with Equation 3 and used to perform switching from the speed command for base to the speed command for supply is a value smaller than or equal to 0.

Torque limit value [Nm]=(supply threshold value [W]−total power consumption amount [W])/ rotation speed of servomotor for buffer 12 [rad/s]  (3)

Further, when the total power consumption amount with respect to the DC link 4-A calculated by the power consumption amount calculation unit 17 falls below the power storage threshold value (second threshold value), the motor control unit for buffer 16-A performs switching from the speed command for base to allow the servomotor for buffer 12 to rotate at the base rotation speed to the speed command for power storage to allow the same to rotate at the rotation speed for power storage. In such a case, the torque limit value calculation unit 19 calculates a torque limit value with respect to the servomotor for buffer 12 using the below Equation 4. The same is also applied to a case in which the total power consumption amount with respect to the DC link 4-B calculated by the power consumption amount calculation unit 17 exceeds the power storage threshold value (second threshold value). Note that in Equation 4, an absolute value of a value in which the total power consumption amount is subtracted from the power storage threshold value represents the power storage power supply capacity amount. The torque limit value calculated in accordance with Equation 4 and used to perform switching from the speed command for base to the speed command for power storage is a value larger than or equal to 0.

Torque limit value [Nm]=(power storage threshold value [W]−total power consumption amount [W])/rotation speed of servomotor for buffer 12 [rad/s]  (4)

Still further, when the total power consumption amount with respect to the DC link 4-A calculated by the power consumption amount calculation unit 17 as exceeding the supply threshold value, however, falls below the supply threshold value, the motor control unit for buffer 16-A performs switching from the speed command for supply to allow the same to rotate at the rotation speed for power supply to the speed command for base to allow the servomotor for buffer 12 to rotate at the base rotation speed. In such a case, the torque limit value calculation unit 19 calculates a torque limit value with respect to the servomotor for buffer 12 using the below Equation 5. The same is also applied to a case in which the total power consumption amount with respect to the DC link 4-B calculated by the power consumption amount calculation unit 17 as exceeding the supply threshold value, however, falls below the supply threshold value. Note that in Equation 5, an absolute value of a value in which the total power consumption amount is subtracted from the power supply threshold value represents the power storage power supply capacity amount. The torque limit value calculated in accordance with Equation 5 and used to perform switching from the speed command for supply to the speed command for base is a value larger than or equal to 0.

Torque limit value [Nm]=(supply threshold value [W]−total power consumption amount [W])/ rotation speed of servomotor for buffer 12 [rad/s]  (5)

Still further, when the total power consumption amount with respect to the DC link 4-A calculated by the power consumption amount calculation unit 17 as falling below the power storage threshold value, however, exceeds the power storage threshold value, the motor control unit for buffer 16-A performs switching from the speed command for power storage to allow the servomotor for buffer 12 to rotate at the rotation speed for power storage to the speed command for base to allow the same to rotate at the base rotation speed. In such a case, the torque limit value calculation unit 19 calculates a torque limit value with respect to the servomotor for buffer 12 using the below Equation 6. The same is also applied to a case in which the total power consumption amount with respect to the DC link 4-B calculated by the power consumption amount calculation unit 17 as falling below the power storage threshold value, however, exceeds the power storage threshold value. Note that in Equation 6, an absolute value of a value in which the total power consumption amount is subtracted from the power storage threshold value represents the power storage power supply capacity amount. The torque limit value calculated in accordance with Equation 6 and used to perform switching from the speed command for power storage to the speed command for base is a value smaller than or equal to 0.

Torque limit value [Nm]=(power storage threshold value [W]−total power consumption amount [W])/rotation speed of servomotor for buffer 12 [rad/s]  (6)

Note that in Equations 3 to 6, a rotation speed [rad/s] of the servomotor for buffer 12 is a positive number.

In the first embodiment, whether or not to perform a torque control using a torque limit value calculated as described above is determined in accordance with a content of the power storage power supply capacity amount with respect to each of the inverters for buffer 13-A and 13-B calculated by the power storage power supply amount calculation unit 18. The content of the torque control includes the following four patterns. Which pattern is relevant is determined by each of the torque control units 42-A and 42-B on the basis of a calculation result by the power storage power supply capacity amount calculation unit 18 a comparison result by the comparison unit 20. If power conversion of the inverters for buffer 13-A and 13-B connected to the respective windings of the servomotor for buffer 12 is uniformly controlled, there may occur a case in which taking-in and an output of a DC power by each of the inverters for buffer 13-A and 13-B is excessive, and thus the motor control units for buffer 16-A and 16-B control driving of the servomotor for buffer 12 by separately controlling power conversion of the respective inverters for buffer 13-A, 13-B respectively connected to the windings.

When a torque control suing a torque limit value is performed, the torque control units 42-A and 42-B in the motor control units for buffer 16-A and 16-B perform a torque control with respect to the servomotor for buffer 12 while changing an upper limit value and a lower limit value of a torque command using a torque limit value calculated by the torque limit value calculation unit 19 in accordance with Equations 3 to 6, and generate a current command. In other words, the torque limit units 52-A and 52-B in the torque control units 42-A and 42-B limit an upper limit value and a lower limit value of a torque command using a torque limit value as expressed by the below Equation 7.

$$-|\text{Torque limit value}| \leq \text{torque command} \leq |\text{torque limit value}| \tag{7}$$

A first pattern relates to a torque control in a case in which all the power storage power supply capacity amounts with respect to the inverters for buffer indicate a DC power amount which can be taken in from the DC links (i.e. DC power amount which the power storage device 10 can store). When determining that the first pattern is relevant, the torque control units of the motor control units for buffer perform, with respect to each of the inverters for buffer, a torque control with respect to the servomotor for buffer, while changing an upper limit value and a lower limit value of a torque command using a torque limit value so as to adjust a DC power amount taken in from the DC links by the inverters for buffer. In examples of FIGS. 1 and 4, when the power storage power supply capacity amount with respect to the inverter for buffer 13-A and the power storage power supply capacity amount with respect to the inverter for buffer 13-B indicate a DC power amount which can be taken in from the DC links 4-A and 4-B, respectively, the torque control unit 42-A in the motor control unit for buffer 16-A performs a torque control with respect to the servomotor for buffer 12, while changing an upper limit value and a lower limit value of a torque command using a torque limit value by the torque limit unit 52-A so as to adjust a DC power amount taken in from the DC link 4-A into the servomotor for buffer 12 side by the inverter for buffer 13-A and adjust a DC power amount taken in from the DC link 4-B into the servomotor for buffer 12 side by the inverter for buffer 13-B. Note that in the first pattern, a control to take in a DC power from the DC links 4-A and 4-B into the servomotor for buffer 12 side respectively by the inverters for buffer 13-A and 13-B is performed, but as already described, the motor control unit for buffer 16-A generates the speed command for supply so as to allow the servomotor for buffer 12 to rotate at the rotation speed for power supply smaller than the predetermined base rotation speed when the total power consumption amount with respect to the DC link 4-A calculated by the power consumption amount calculation unit 17 exceeds the supply threshold value (first threshold value), and the motor control unit for buffer 16-B generates the speed command for supply so as to allow the servomotor for buffer 12 to rotate at the rotation speed for power supply smaller than the predetermined base rotation speed when the total power consumption amount with respect to the DC link 4-B calculated by the power consumption amount calculation unit 17 exceeds the supply threshold value (first threshold value).

A second pattern relates to a torque control in a case in which all the power storage power supply capacity amounts with respect to the inverters for buffer indicate a DC power amount which can be outputted to the DC links (i.e. DC power amount which the power storage device 10 can supply). When determining that the second pattern is relevant, the torque control units of the motor control units for buffer perform, with respect to each of the inverters for buffer, a torque control with respect to the servomotor for buffer, while changing an upper limit value and a lower limit value of a torque command using a torque limit value so as to adjust a DC power amount outputted to the DC links by the inverters for buffer. In the examples of FIGS. 1 and 4, when the power storage power supply capacity amount with respect to the inverter for buffer 13-A and the power storage power supply capacity amount with respect to the inverter for buffer 13-B indicate a DC power amount which can be outputted to the DC links 4-A and 4-B, respectively, the torque control unit 42-A in the motor control unit for buffer 16-A performs a torque control with respect to the servomotor for buffer 12, while changing an upper limit value and a lower limit value of a torque command using a torque limit value by the torque limit unit 52-A so as to adjust a DC power amount outputted to the DC link 4-A from the servomotor for buffer 12 side by the inverter for buffer 13-A and adjust a DC power amount outputted to the DC link 4-B from the servomotor for buffer 12 side by the inverter for buffer 13-B. Note that in the second pattern, a control to output a DC power to the DC links 4-A and 4-B respectively by the inverters for buffer 13-A and 13-B is performed, but as already described, the motor control unit for buffer 16-A generates the speed command for power storage so as to allow the servomotor for buffer 12 to rotate at the rotation speed for power storage larger than the predetermined base rotation speed when the total power consumption amount with respect to the DC link 4-A calculated by the power consumption amount calculation unit 17 falls below the power storage threshold value (second threshold value).

As a case in which the neither the first pattern nor the second pattern is relevant, there is a case in which with respect to each of the inverters for buffer, a content indicated by the power storage power supply capacity amounts with respect to the inverters for buffer is divided into a DC power amount which can be taken in from the DC links (i.e. DC power amount which the power storage device 10 can store) and a DC power amount which can be outputted to the DC links (i.e. DC power amount which the power storage device 10 can supply). In such a case, the comparison unit 20 compares a magnitude of an absolute value of a sum total of the power storage power supply capacity amounts for indicating a DC power amount which can be taken in from the DC links by the inverters for buffer and a magnitude of an absolute value of a sum total of the power storage power supply capacity amounts for indicating a DC power amount which can be outputted to the DC links by the inverters for buffer, and in accordance with a comparison result by the comparison unit 20, the torque control units 42-A and 42-B perform a torque control using torque commands generated by the speed control units 41-A and 41-B, respectively, on the basis of a third pattern or a fourth pattern as described below.

The third pattern relates to a torque control in a case in which the power storage power supply capacity amount determined by the comparison unit 20 to have a large absolute value indicates a DC power amount which can be taken in from the DC link (i.e. DC power amount which the power storage device 10 can store). When determining that the third pattern is relevant, the torque control units of the motor control units for buffer perform, with respect to the inverter for buffer which can take in a DC power from the DC link, a torque control with respect to the servomotor for buffer, while changing an upper limit value and a lower limit value of a torque command using a torque limit value so as to adjust a DC power amount taken in from the DC link to the servomotor for buffer side by the inverter for buffer, while not performing, with respect to the inverter for buffer which indicates that a DC power can be outputted to the DC link, a torque control with respect to the servomotor for buffer. For example, in FIGS. 1 and 4, the power storage power supply capacity amount indicating a DC power amount which can be taken in from the DC link 4-A by the inverter for buffer 13-A is 40 [kW] and the power storage power supply capacity amount indicating a DC power amount which can be outputted to the DC link 4-B by the inverter for buffer 13-B is 20 [kW], if the absolute values of the respective power storage power supply capacity amounts are compared, 40 [kW] which is the power storage power supply capacity amount indicating a DC power amount which can be taken in from the DC link 4-A by the inverter for buffer 13-A is larger. Then, the torque control unit 42-A in the motor control unit for buffer 16-A performs, with respect to the inverter for buffer 13-A which can take in a DC power from the DC link 4-A, a torque control with respect to the servomotor for buffer 12, while changing an upper limit value and a lower limit value of a torque command using a torque limit value by the torque limit unit 52-A so as to adjust a DC power amount taken in from the DC link 4-A to the servomotor for buffer 12 side by the inverter for buffer 13-A, whereas the torque control unit 42-B in the motor control unit for buffer 16-B does not perform, with respect to the inverter for buffer 13-B which indicates that a DC power can be outputted to the DC link 4-B, a torque control with respect to the servomotor for buffer 12 by setting the torque limit value to be zero and prevents the inverter for buffer 13-B from outputting a DC power to the DC link 4-B.

The fourth pattern relates to a torque control in a case in which the power storage power supply capacity amount determined by the comparison unit 20 to have a large absolute value indicates a DC power amount which can be outputted to the DC link (i.e. DC power amount which the power storage device 10 can supply). When determining that the fourth pattern is relevant, the torque control units of the motor control units for buffer perform, with respect to the inverter for buffer which can output a DC power to the DC link, a torque control with respect to the servomotor for buffer, while changing an upper limit value and a lower limit value of a torque command using a torque limit value so as to adjust a DC power amount outputted to the DC link to the servomotor for buffer side by the inverter for buffer, while not performing, with respect to the inverter for buffer which indicates that a DC power can be taken in from the DC link, a torque control with respect to the servomotor for buffer. For example, in FIGS. 1 and 4, the power storage power supply capacity amount indicating a DC power amount which can be taken in from the DC link 4-A by the inverter for buffer 13-A is 10 [kW] and the power storage power supply capacity amount indicating a DC power amount which can be outputted to the DC link 4-B by the inverter for buffer 13-B is 30 [kW], if the absolute values of the respective power storage power supply capacity amounts are compared, 30 [kW] which is the power storage power supply capacity amount indicating a DC power amount which can be outputted to the DC link 4-B by the inverter for buffer 13-B is larger. Then, the torque control unit 42-B in the motor control unit for buffer 16-B performs a torque control with respect to the servomotor for buffer 12, while changing an upper limit value and a lower limit value of a torque command using a torque limit value by the torque limit unit 52-B so as to adjust a DC power amount outputted to the DC link 4-B by the inverter for buffer 13-B, whereas the torque control unit 42-A in the motor control unit for buffer 16-A does not perform, with respect to the inverter for buffer 13-A which indicates that a DC power can be taken in from the DC link 4-A, a torque control with respect to the servomotor for buffer 12 by setting the torque limit value to be zero and prevents the inverter for buffer 13-A from taking in a DC power from the DC link 4-A to the servomotor for buffer 12 side.

Note that with respect to the third and fourth patterns, by way of example, the servomotor for buffer 12 of a two-winding type as illustrated in FIGS. 1 and 4 has been described, but in a case of three or more windings, the above process is performed on the basis of a result of comparing a magnitude of an absolute value of a sum total of the power storage power supply capacity amounts for indicating a DC power amount which can be taken in from the DC links by the inverters for buffer and a magnitude of an absolute value of a sum total of the power storage power supply capacity amounts for indicating a DC power amount which can be outputted to the DC links by the inverters for buffer. For example, when the power storage device includes the servomotor for buffer of a four-winding type (unillustrated), if the power storage power supply capacity amounts with respect to the four inverters for buffer are respectively "10 [kW] which can be taken in (stored) from the DC link", "20 [kW] which can be outputted (supplied) to the DC link", "15 [kW] which can be taken in (stored) from the DC link", and "10 [kW] which can be outputted (supplied) to the DC link", a sum total of the DC power amounts which can be taken in (stored) from the DC link is 25 (=10+15) [kW] and a sum total of the DC power amounts which can be outputted (supplied) to the DC link is 30 (=20+10) [kW]. Thus, through the comparison processing by the comparison unit 20, the sum total of the DC power amounts which can be outputted (supplied) to the DC link is large so that the motor control unit for buffer 16 perform the control in accordance with the fourth pattern. Further, for example, if the power storage power supply capacity amounts with respect to the four inverters for buffer are respectively "10 [kW] which can be taken in (stored) from the DC link", "20 [kW] which can be taken in (stored) to the DC link", "15 [kW] which can be taken in (stored) from the DC link", and "10 [kW] which can be outputted (supplied) to the DC link", a sum total of the DC power amounts which can be taken in (stored) from the DC link is 45 (=10+20+15) [kW] and a sum total of the DC power amounts which can be outputted (supplied) to the DC link is 10 [kW]. Thus, through the comparison processing by the comparison unit 20, the sum total of the DC power amounts which can be taken in (stored) from the DC link is large so that the motor control unit for buffer 16 perform the control in accordance with the third pattern.

The current control unit 43-A following the torque control unit 42-A as described above generates a drive command for allowing a current flowing in the inverter for buffer 13-A to follow a current command generated by the torque control unit 42-A. A drive command generated by the current control unit 43-A is transmitted to the inverter for buffer 13-A, and the inverter for buffer 13-A performs power conversion between a DC power in the DC link 4-A and an AC power which is a drive power or a regenerative power of the servomotor for buffer 12 through an on/off control of each switching element in accordance with the drive command. Further, the current control unit 43-B following the torque control unit 42-B as described above generates a drive command for allowing a current flowing in the inverter for buffer 13-B to follow a current command generated by the torque control unit 42-B. A drive command generated by the current control unit 43-B is transmitted to the inverter for buffer 13-B, and the inverter for buffer 13-B performs power conversion between a DC power in the DC link 4-B and an AC power which is a drive power or a regenerative power of the servomotor for buffer 12 through an on/off control of each switching element in accordance with the drive command. As described with reference to FIGS. 2A and 2B, the servomotor for buffer 12 includes the plurality of windings, and from the plurality of windings, one set of the windings (U1, U2, V1, V2, W1, W2 in FIG. 2B) is connected to the inverter for buffer 13-A, while from the above plurality of windings, the other set of the windings (U3, U4, V3, V4, W3, W4 in FIG. 2B) is connected to the inverter for buffer 13-B. With respect to the servomotor for buffer 12, an output and an input of an AC power is performed through these two inverters for buffer 13-A and 13-B, but in many cases, the inverters for buffer 13-A and 13-B are different from each other in AC power amount and input and output direction thereof. Thus, torques generated at the respective windings in the servomotor for buffer 12 are different from each other, but the servomotor for buffer 12 rotates while dominated by a larger torque. In other words, a rotation state of the servomotor for buffer 12 is uniquely determined in accordance with an AC power amount and an input and output direction thereof of each of the inverters for buffer 13-A and 13-B. The motor control units for buffer 16-A and 16-B (the motor control unit for buffer 16 in FIG. 1) control power conversion of the inverters for buffer 13-A and 13-B, whereby the servomotor for buffer 12 to which the flywheel 11 is connected rotates while accelerating or decelerating, or rotates at a constant speed, conversion between a rotation energy of the flywheel 11 and an electrical energy in the DC links 4-A and 4-B is made so that a DC power amount to be stored or supplied by the power storage device 10 (a DC power amount transferred by the power storage device 10 with respect to the DC links 4-A and 4-B) is adjusted.

Thus, in the first embodiment, with respect to the servomotor for buffer 12 calculated in accordance with Equation 2, a speed control is performed using a speed command set by the speed command switch units 51-A and 51-B, and further, a torque control using a torque limit value in accordance with a content of the power storage power supply capacity amount of each of the inverters for buffer. A torque limit value is set using the total power consumption amount calculated by the power consumption amount calculation unit 17, and by a torque control using the torque limit value, the servomotor for buffer 12 is driven so that a responsiveness of the power storage device 10 is enhanced.

Figure 5A:
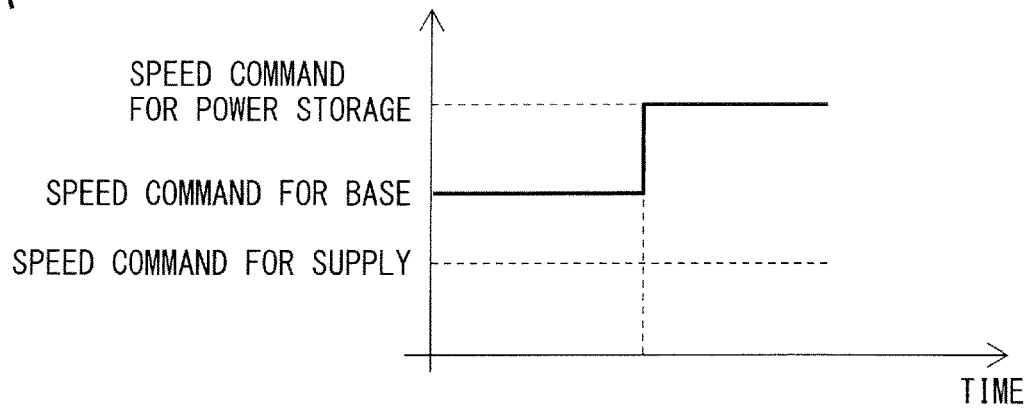
FIG. 5A is a diagram illustrating an example of switching a speed command in the motor drive system according to the first embodiment, and illustrates an example of switching the same in a stepwise manner each between speed commands.
Figure 5B:
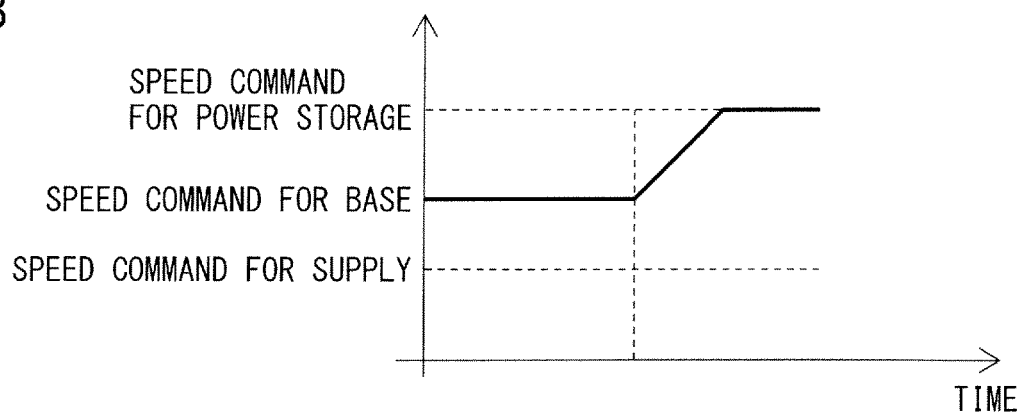
FIG. 5B is a diagram illustrating an example of switching of a speed command in the motor drive system according to the first embodiment, and illustrates an example of switching the same while changing the same with a linear time constant each between the speed commands.
Figure 5C:
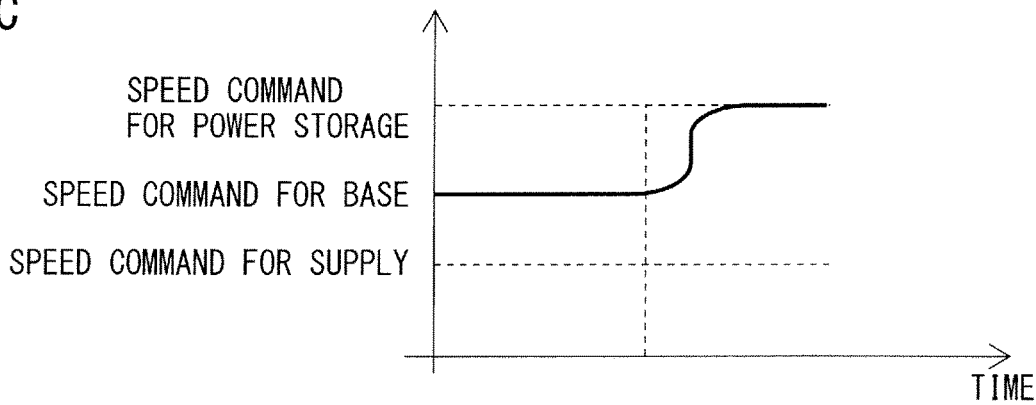
FIG. 5C is a diagram illustrating an example of switching of a speed command in the motor drive system according to the first embodiment, and illustrates an example of switching the same while changing the same with a bell-shaped time constant each between the speed commands.
Figure 5D:
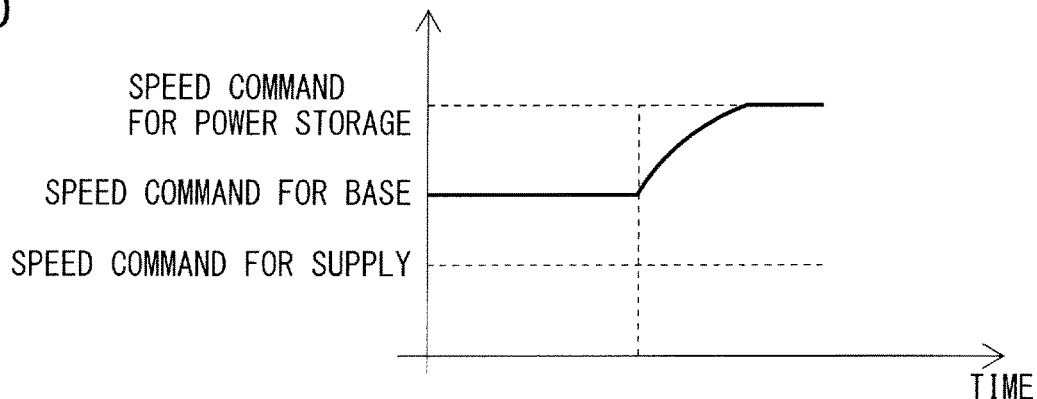
FIG. 5D is a diagram illustrating an example of switching of a speed command in the motor drive system according to the first embodiment, and illustrates an example of switching the same while changing the same with an exponential time constant each between the speed commands.

FIG. 5A is a diagram illustrating an example of switching a speed command in the motor drive system according to the first embodiment, and illustrates an example of switching the same in a stepwise manner each between speed commands. FIG. 5B is a diagram illustrating an example of switching of a speed command in the motor drive system according to the first embodiment, and illustrates an example of switching the same while changing the same with a linear time constant each between the speed commands. FIG. 5C is a diagram illustrating an example of switching of a speed command in the motor drive system according to the first embodiment, and illustrates an example of switching the same while changing the same with a bell-shaped time constant each between the speed commands. FIG. 5D is a diagram illustrating an example of switching of a speed command in the motor drive system according to the first embodiment, and illustrates an example of switching the same while changing the same with an exponential time constant each between the speed commands. As described above, a speed command employed by the speed control units 41-A and 41-B is of three types including the speed command for supply, the speed command for power storage, and the speed command for base, and in accordance with a magnitude relationship between the total power consumption amount calculated by the power consumption amount calculation unit 17 and each threshold value, the speed command switch units 51-A and 51-B respectively provided to the speed control units 41-A and 41-B in the motor control units for buffer 16-A and 16-B (the motor control unit for buffer 16 in FIG. 1) perform switching among such speed commands. In FIGS. 5A to 5D, to clarify the illustration, with respect to the speed command switch unit 51-A, switching from the speed command for base to the speed command for power storage is illustrated, but switching from the peed command for power storage to the speed command for base, switching from the speed command for base to the speed command for supply, and switching from the speed command for supply to the speed command for base can be also similarly performed. Further, the same can be also applied to the speed command switch unit 51-B.

For example, it is also possible that the speed command switch unit 51-A performs switching of respective speed commands for rotating the servomotor for buffer 12 at the rotation speed for power supply, the base rotation speed, and the rotation speed for power storage in a stepwise manner each between the speed commands. Switching in a stepwise manner each between the speed commands allows a responsiveness of power storage and power supply of the power storage device 10 to be further enhanced. For example, as illustrated in FIG. 5A, the speed command switch unit 51-A performs switching from the speed command for base to allow the servomotor for drive 12 to rotate at the base rotation speed to the speed command for power storage in a stepwise manner.

Further, for example, as illustrated in FIGS. 5B to 5D, it is also possible that the speed command switch unit 51-A performs switching of respective speed commands for rotating the servomotor for buffer 12 at the rotation speed for power supply, the base rotation speed, and the rotation speed for power storage in a continuous manner without a gap each between the speed commands. Switching not in a stepwise manner but in a continuous manner without a gap each between the speed commands allows the speed commands not to radically change, which is advantageous in decreasing a load on the servomotor for buffer 12. For example, as illustrated in FIG. 5B, the speed command switch unit 51-A performs switching from the speed command for base to allow the servomotor for buffer 12 to rotate at the base rotation speed, while changing the same with a linear time constant, to the speed command for power storage in a stepwise manner. For example, as illustrated in FIG. 5C, the speed command switch unit 51-A performs switching from the speed command for base to allow the servomotor for buffer 12 to rotate at the base rotation speed, while changing the same with a bell-shaped time constant, to the speed command for power storage in a stepwise manner. For example, as illustrated in FIG. 5D, the speed command switch unit 51-A performs switching from the speed command for base to allow the servomotor for buffer 12 to rotate at the base rotation speed, while changing the same with an exponential time constant, to the speed command for power storage in a stepwise manner.

Note that in the first embodiments, in order to switch a speed of the servomotor for buffer 12 to the rotation speed for power supply, the base rotation speed, or the rotation speed for power storage in accordance with the total power consumption amount, it is configured that the speed command switch units 51-A and 51-B are provided in the motor control units for buffer 16-A and 16-B (the motor control unit for buffer 16 in FIG. 1), and the speed command switch units 51-A and 51-B perform switching to the rotation speed for power supply, the rotation speed for power storage, or the base rotation speed in accordance with the total power consumption amount. As a modification example of command for switching a speed of the servomotor for buffer 12 to the rotation speed for power supply, the rotation speed for power storage, or the base rotation speed in accordance with the total power consumption amount, a position command switch unit (unillustrated) can also be provided in the motor control units for buffer 16-A and 16-B (the motor control unit for buffer 16 in FIG. 1), and the position command switch unit performs switching to a position command for supply, a position command for power storage, or a position command for base in accordance with the total power consumption amount. For example, the position command for supply, the position command for power storage, and the position command for base may be each set to be such a ramp command as to satisfy a relationship of "a change amount of the position command for supply<a change amount of the position command for base<a change amount of the position command for power storage", and the position command switch unit may switch such a command in accordance with the total power consumption amount. One example is as follows.

Position command for supply [mm]=actual position [mm]+speed command for supply [mm/s]/position gain [1/s]

Position command for power storage [mm]=actual position [mm]+speed command for power storage [mm/s]/position gain [1/s]

Position command for base [mm]=actual position [mm]+speed command for base [mm/s]/position gain [1/s]

Thus, even switching to the position command for supply, the position command for power storage, or the position command for base in accordance with the total power consumption amount can also produce effects similar to those produced by switching to the rotation speed for supply, the rotation speed for power storage, or the rotation speed for base.

In each of the embodiments of switching of a speed command and of switching of a position command, the torque control units 42-A and 42-B perform, in accordance with a content of the power storage power supply capacity amount with respect to each of the inverters for buffer 13-A and 13-B calculated by the power storage power supply amount calculation unit 18, a torque control with respect to the servomotor for buffer 12 while changing an upper limit value and a lower limit value of a torque command using a torque limit value calculated by the torque limit value calculation unit 19, and generates a current command.

Figure 6:
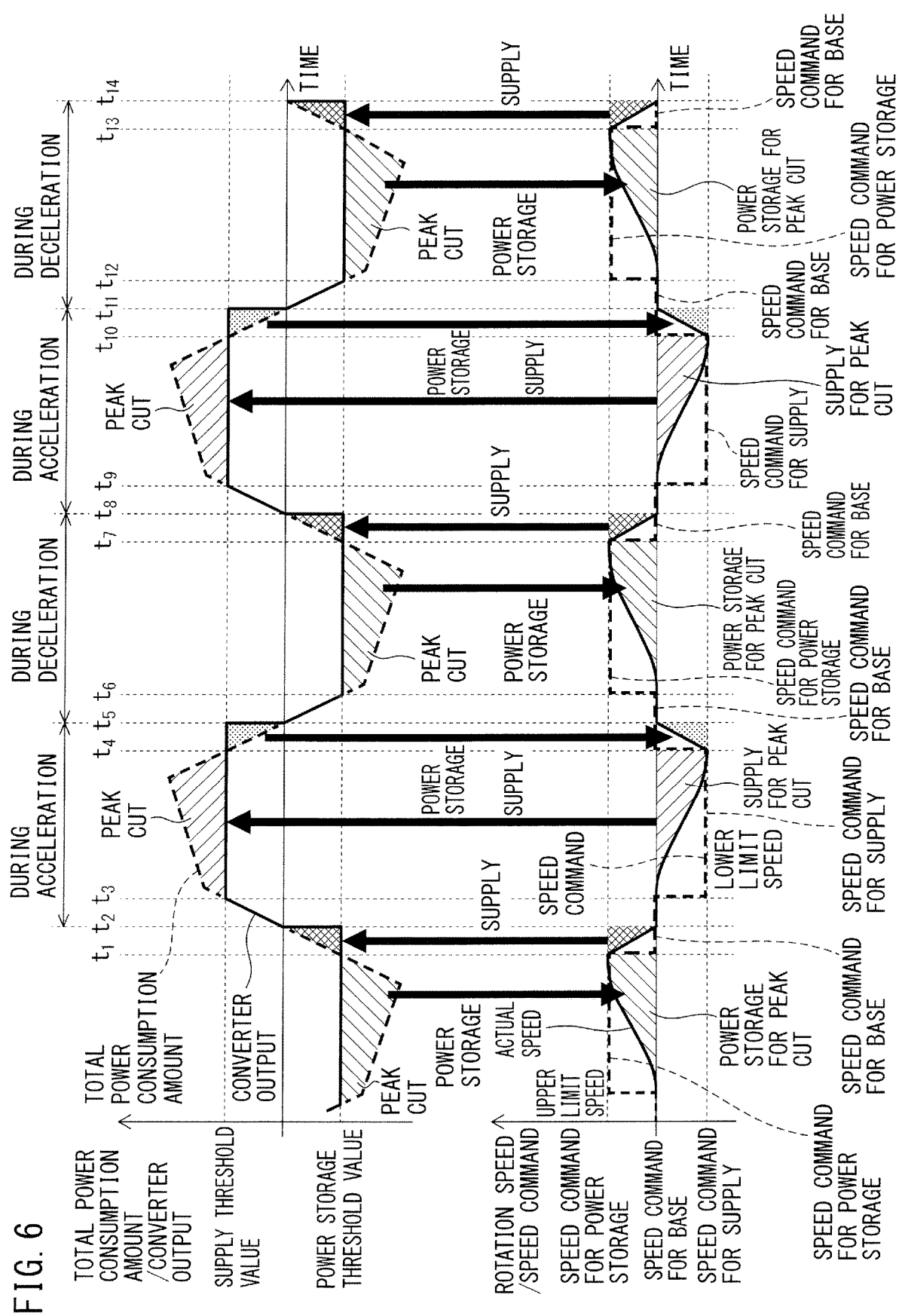
FIG. 6 is a diagram illustrating a relationship between a total power consumption amount and a rotation speed of the servomotor for buffer in the motor drive system according to the first embodiment.

FIG. 6 is a diagram illustrating a relationship between a total power consumption amount and a rotation speed of the servomotor for buffer in the motor drive system according to the first embodiment. In FIG. 6, to clarify the illustration, there is illustrated a case in which deceleration and acceleration of the servomotor for drive 3-B is repeatedly performed, but the same can be also applied to the servomotors for drive 3-A1 and 3-A2. In FIG. 6, the total power consumption amount calculated by the power consumption amount calculation unit 17 (broken line) and an output of the converter 14-B (solid line); and a rotation speed of the servomotor for buffer 12 (solid line) and a speed command (broken line) in a case of repeatedly performing deceleration and acceleration of the servomotor for drive 3 are indicated in the upper portion and in the lower portion, respectively.

In FIG. 6, until time $t_1$, when the servomotor for drive 3-B is decelerated, a regenerative power is generated and the total power consumption amount calculated by the power consumption amount calculation unit 17 (i.e. sum of an output of the servomotor for drive 3-B, a winding loss at the servomotor for drive 3-B, a loss at the converter 14-B, and a loss at the inverter for drive 15-B) is decreased. When the total power consumption amount falls below the power storage threshold value, in order to decrease (cut) a power peak, the speed command switch unit 51-B outputs the speed command for power storage to allow the servomotor for buffer 12 to rotate at the rotation speed for power storage. The motor control unit for buffer 16-B controls a power conversion operation of the inverter for buffer 13-B using the speed command for power storage set by the speed command switch unit 51-B and a torque limit value calculated by the torque limit value calculation unit 19, whereby a rotation speed of the servomotor for buffer 12 is gradually increased and is stored as a rotation energy of the flywheel 11.

At time $t_1$, when the total power consumption amount calculated by the power consumption amount calculation unit 17 exceeds the power storage threshold value, the speed command switch unit 51-B outputs the speed command for base to allow the servomotor for buffer 12 to rotate at the base rotation speed. As a result, the servomotor for buffer 12 is decelerated and a regenerative power is generated. Until the servomotor for buffer 12 returns to the base rotation speed (time $t_2$), a generated AC regenerative power is converted by the inverter for buffer 13-B to a DC power and supplied to the DC link 4-B, and further converted by the converter 14-B to an AC power and returned to the power supply 2 side.

Then, when the servomotor for drive 3-B is accelerated, the total power consumption amount is gradually increased. When the total power consumption amount exceeds the supply threshold value (time $t_3$), in order to decrease (cut) a power peak, the speed command switch unit 51-B outputs the speed command for supply to allow the servomotor for buffer 12 to rotate at the rotation speed for supply. The motor control unit for buffer 16-B controls a power conversion operation of the inverter for buffer 13-B using the speed command for supply set by the speed command switch unit 51-B and a torque limit value calculated by the torque limit value calculation unit 19, whereby a rotation speed of the servomotor for buffer 12 is gradually decreased and a regenerative power is generated. A generated AC regenerative power is converted by the inverter for buffer 13-B to a DC power and supplied to the DC link 4-B. A DC power supplied to the DC link 4-B is converted by the inverter for drive 15-B to an AC power and consumed as a drive power of the servomotor for drive 3-B.

Then, for example, when the servomotor for drive 3-B is decelerated, a regenerative power is generated and the total power consumption amount is gradually decreased. When the total power consumption amount is gradually decreased and falls below the supply threshold value (time $t_4$), the speed command switch unit 51-B outputs the speed command for base to allow the servomotor for buffer 12 to rotate at the base rotation speed. The motor control unit for buffer 16-B controls a power conversion operation of the inverter for buffer 13-B using the speed command for base set by the speed command switch unit 51-B and a torque limit value calculated by the torque limit value calculation unit 19. Until the servomotor for buffer 12 returns to the base rotation speed (time $t_5$), due to an energy supplied from the power supply 2 side through the converter 14-B, a rotation speed of the servomotor for buffer 12 is gradually increased.

At time $t_5$, when the servomotor for buffer 12 comes to rotate at the constant base rotation speed, power storage by the power storage device 10 is terminated, and due to a power regenerated in the servomotor for drive 3-B, the total power consumption amount is gradually decreased. When the total power consumption amount falls below the power storage threshold value (time $t_6$), in order to decrease (cut) a power peak, the speed command switch unit 51-B outputs the speed command for power storage to allow the servomotor for buffer 12 to rotate at the rotation speed for power storage. The motor control unit for buffer 16-B controls a power conversion operation of the inverter for buffer 13-B using the speed command for power storage set by the speed command switch unit 51-B and a torque limit value calculated by the torque limit value calculation unit 19, whereby a rotation speed of the servomotor for buffer 12 is gradually increased and is stored as a rotation energy of the flywheel 11. Hereinafter, such an operation is performed.

In the above embodiment, when the total power consumption amount falls below the power storage threshold value, the speed command switch unit 51-B performs switching from the base speed command to the speed command for power storage to store a power in the power storage device 10, and then, it is determined that storage of a DC power by the power storage device 10 is no longer necessary when the total power consumption amount exceeds the power storage threshold value, and the speed command switch unit 51-B performs switching from the speed command for power storage to the base speed command. Similarly, when the total power consumption amount exceeds the supply threshold value, the speed command switch unit 51-B performs switching from the base speed command to the speed command for supply to supply a DC power from the power storage device 10 to the DC link 4-B, and then, it is determined that supply of a DC power by the power storage device 10 is no longer necessary when the total power consumption amount falls below the supply threshold value, and the speed command switch unit 51-B performs switching from the speed command for supply to the base speed command.

To modify the above embodiment, it is also possible not to perform switching from the speed command for power storage or the speed command for supply to the base speed command as soon as storage or supply of a DC power by the power storage device 10 is no longer necessary but to perform switching to the base speed command with some time after storage or supply of a DC power by the power storage device 10 is no longer necessary. Such an embodiment will be described with reference to FIG. 7.

Figure 7:
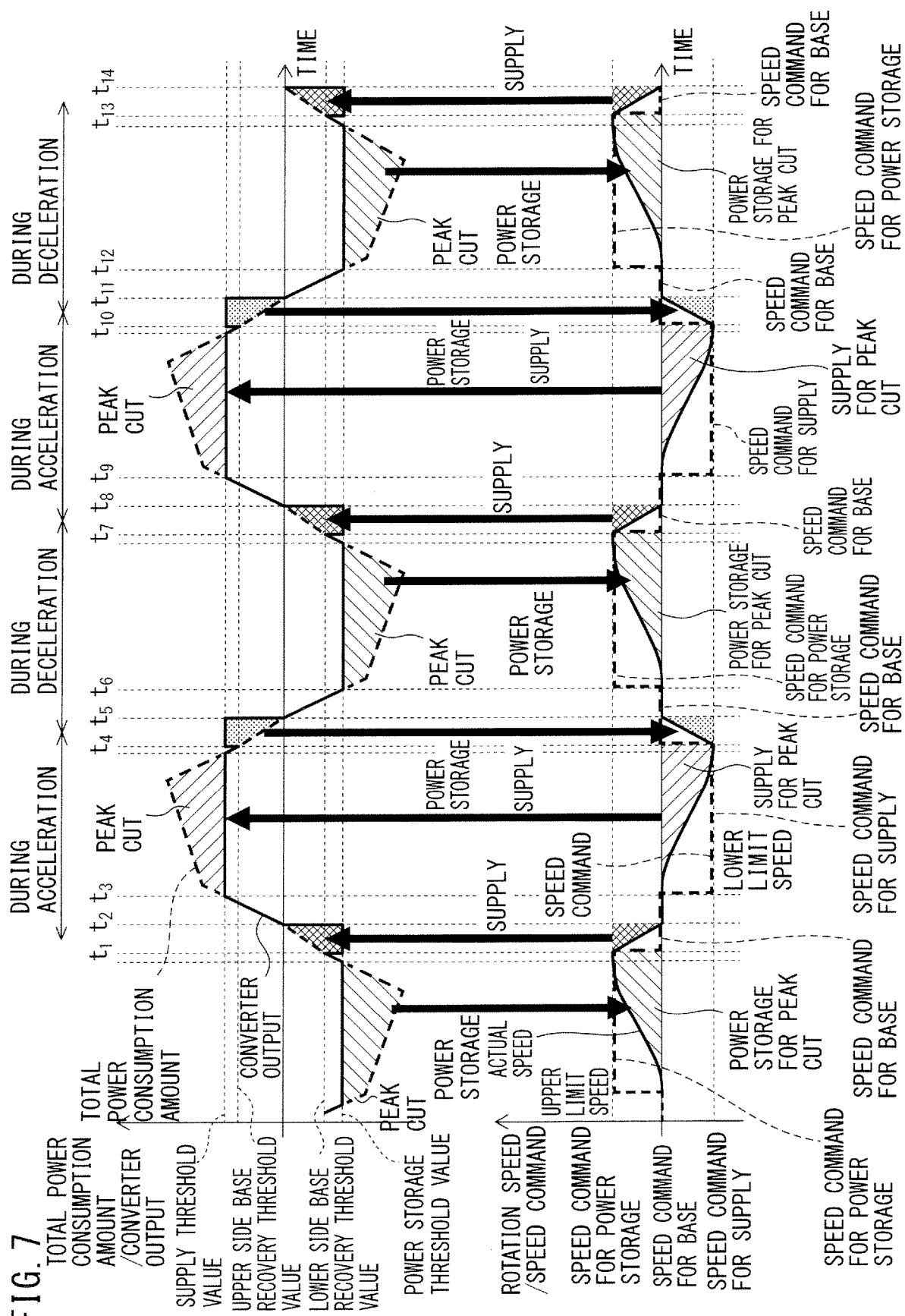
FIG. 7 is a diagram illustrating a relationship between the total power consumption amount and a rotation speed of the servomotor for buffer in the motor drive system according to another embodiment.

FIG. 7 is a diagram illustrating a relationship between the total power consumption amount and a rotation speed of the servomotor for buffer in the motor drive system according to another embodiment. In FIG. 7, to clarify the illustration, there is illustrated a case in which deceleration and acceleration of the servomotor for drive 3-B is repeatedly performed, but the same can be also applied to the servomotors for drive 3-A1 and 3-A2. In, FIG. 7, the total power consumption amount calculated by the power consumption amount calculation unit 17 (broken line) and an output of the converter 14-B (solid line); and a rotation speed of the servomotor for buffer 12 (solid line) and a speed command (broken line) in a case of repeatedly performing deceleration and acceleration of the servomotor for drive 3 are indicated in the upper portion and in the lower portion, respectively. In another embodiment, a third threshold value for returning a rotation speed of the servomotor for buffer 12 from the rotation speed for power supply to the base rotation speed is set to be an upper side base recovery threshold value smaller than the supply threshold value (first threshold value) and larger than the power storage threshold value (second threshold value). Further, a fourth threshold value for returning a rotation speed of the servomotor for buffer 12 from the rotation speed for power storage to the base rotation speed is set to be a lower side base recovery threshold value larger than the power storage threshold value (second threshold value) and smaller than the upper side base recovery threshold value (third threshold value). In other words, in the present embodiment, the motor control unit for buffer 16-B controls power conversion of the inverter for buffer 13-B so that the servomotor for buffer 12 rotates at the base rotation speed when the total power consumption amount falls below the upper side base recovery threshold value (third threshold value) while the motor control unit for buffer 16-B controls power conversion of the inverter for buffer 13-B so that the servomotor for buffer 12 rotates at the rotation speed for power supply. Thus, the speed command switch unit 51-B in the motor control unit for buffer 16-B performs switching from the speed command for supply to the speed command for base when the total power consumption amount falls below the upper side base recovery threshold value (third threshold value) while the motor control unit for buffer 16-B controls power conversion of the inverter for buffer 13-B so that the servomotor for buffer 12 rotates at the rotation speed for power supply. Further, the motor control unit for buffer 16-B controls power conversion of the inverter for buffer 13-B so that the servomotor for buffer 12 rotates at the base rotation speed when the total power consumption amount exceeds the lower side base recovery threshold value (fourth threshold value) while the motor control unit for buffer 16-B controls power conversion of the inverter for buffer 13-B so that the servomotor for buffer 12 rotates at the rotation speed for power storage. Thus, the speed command switch unit 51-B in the motor control unit for buffer 16-B performs switching from the speed command for power storage to the speed command for base when the total power consumption amount exceeds the lower side base recovery threshold value (fourth threshold value) while the motor control unit for buffer 16-B controls power conversion of the inverter for buffer 13-B so that the servomotor for buffer 12 rotates at the rotation speed for power storage.

For example, in FIG. 7, prior to time $t_1$, while the servomotor for buffer 12 rotates at the rotation speed for power storage in accordance with the speed command for power storage set by the speed command switch unit 51-B, even when the total power consumption amount is gradually increased and exceeds the power storage threshold value, the speed command for power storage set by the speed command switch unit 51-B is maintained. When the total power consumption amount is further increased and exceeds the lower side base recovery threshold value (fourth threshold value) at time $t_1$, the speed command switch unit 51-B performs switching from the speed command for power storage to the speed command for base. As a result, the servomotor for buffer 12 is decelerated and a regenerative power is generated. Until the servomotor for buffer 12 returns to the base rotation speed (time $t_2$), a generated AC regenerative power is converted by the inverter for buffer 13-B to a DC power and supplied to the DC link 4-B, and further converted by the converter 14-B to an AC power and returned to the power supply 2 side.

Further, between time $t_3$ and time $t_4$, while the servomotor for buffer 12 rotates at the rotation speed for power supply in accordance with the speed command for power supply set by the speed command switch unit 51-B, even when the total power consumption amount is gradually decreased and falls below the supply threshold value, the speed command for supply set by the speed command switch unit 51-B is maintained. When the total power consumption amount is further decreased and falls below the upper side base recovery threshold value (third threshold value) at time $t_4$, the speed command switch unit 51-B performs switching from the speed command for supply to the speed command for base. As a result, until the servomotor for buffer 12 returns to the base rotation speed (time $t_5$), using an energy supplied from the power supply 2 side through the converter 14-B, a rotation speed of the servomotor for buffer 12 is gradually increased.

Next, the motor drive system according to the second embodiment will be described. In the above first embodiment, with respect to each of the inverters for buffer, a speed control is performed by switching a speed command in accordance with the total power consumption amount calculated by the power consumption amount calculation unit, and a torque control is performed while changing an upper limit value and a lower limit value of a torque command using a torque limit value in accordance with a content of the power storage power supply capacity amount calculated by the power storage power supply capacity amount calculation unit. On the other hand, in the second embodiment, with respect to each of the inverters for buffer, on the basis of the power storage power supply capacity amount with respect to the inverter for buffer calculated by the power storage power supply capacity amount calculation unit and a rotation speed of the motor for buffer, a torque command with respect to the servomotor for buffer is generated, and using the torque command, a torque control is performed.

FIG. 8 is a block diagram of the motor drive system according to the second embodiment. Similarly to the first embodiment, by way of example, there will be described a case in which the three servomotors for drive 3-A1, 3-A2, and 3-B are controlled by the motor drive system 1 connected to the power supply 2.

As illustrated in FIG. 8, the motor drive system 1 according to the second embodiment includes the flywheel 11, the servomotor for buffer 12, the inverters for buffer 13-A and 13-B, the converters 14-A and 14-B, the inverters for drive 15-A1, 15-A2, and 15-B, a motor control unit for buffer 16', the power consumption amount calculation unit 17, and the power storage power supply amount calculation unit 18. Further, similarly to typical motor drive systems, the motor drive system 1 includes the motor control unit for drive 21 for controlling the inverters for drive 15-A1, 15-A2, and 15-B.

The flywheel 11, the servomotor for buffer 12, the inverters for buffer 13-A and 13-B, the converters 14-A and 14-B, the inverters for drive 15-A1, 15-A2, and 15-B, the power consumption amount calculation unit 17, and the power storage power supply amount calculation unit 18 are similar to those in the first embodiment, and thus a detailed description of these circuit constitutional elements is omitted.

In the second embodiment, the motor control unit for buffer 16' performs, with respect to each of the inverters for buffer 13-A and 13-B, a torque control using a torque command with respect to the servomotor for buffer 12 generated on the basis of the power storage power supply capacity amounts with respect to the inverters for buffer calculated by the power storage power supply capacity amount calculation unit 18 and a rotation speed of the servomotor for buffer 12 detected by the speed detection device 32 so as to adjust a DC power amount taken in from the DC links or outputted to the DC links by the inverters for buffer, respectively. A further detailed description with reference to FIG. 9 will be made in the following.

FIG. 9 is a block diagram illustrating a control loop with respect to the servomotor for buffer in the power storage device in the motor drive system according to the second embodiment.

To the motor control unit for buffer 16' of FIG. 8, motor control units for buffer 16'-A and 16'-B correspond in FIG. 9. A torque control unit 42'-A in the motor control unit for buffer 16'-A creates a torque command used for a torque control of the inverter for buffer 13-A on the basis of the power storage power supply capacity amount with respect to the inverter for buffer 13-A calculated by the power storage power supply capacity amount calculation unit 18 and a rotation speed of the servomotor for buffer 12 detected by the speed detection device 32 using the below Equation 8. Further, a torque control unit 42'-B in the motor control unit for buffer 16'-B creates a torque command used for a torque control of the inverter for buffer 13-B on the basis of the power storage power supply capacity amount with respect to the inverter for buffer 13-B calculated by the power storage power supply capacity amount calculation unit 18 and a rotation speed of the servomotor for buffer 12 detected by the speed detection device 32 using the below Equation 8.

Torque command [Nm] with respect to servomotor for buffer 12=power storage power supply capacity amount [W]/rotation speed of servomotor for buffer 12 [rad/s]  (8)

The torque control unit 42'-A in the motor control unit for buffer 16'-A performs a torque control of the inverter for buffer 13-A using the torque command created in accordance with Equation 8 with respect to the inverter for buffer 13-A and creates a current command with respect to the inverter for buffer 13-A. The torque control unit 42'-B in the motor control unit for buffer 16'-B performs a torque control of the inverter for buffer 13-B using the torque command created in accordance with Equation 8 with respect to the inverter for buffer 13-B and creates a current command with respect to the inverter for buffer 13-B.

The current control unit 43-A following the torque control unit 42'-A as described above generates a drive command for allowing a current flowing in the inverter for buffer 13-A to follow a current command generated by the torque control unit 42'-A. A drive command generated by the current control unit 43-A is transmitted to the inverter for buffer 13-A, and the inverter for buffer 13-A performs power conversion between a DC power in the DC link 4-A and an AC power which is a drive power or a regenerative power of the servomotor for buffer 12 through an on/off control of each switching element in accordance with the drive command. Further, the current control unit 43-B following the torque control unit 42'-B as described above generates a drive command for allowing a current flowing in the inverter for buffer 13-B to follow a current command generated by the torque control unit 42'-B. A drive command generated by the current control unit 43-B is transmitted to the inverter for buffer 13-B, and the inverter for buffer 13-B performs power conversion between a DC power in the DC link 4-B and an AC power which is a drive power or a regenerative power of the servomotor for buffer 12 through an on/off control of each switching element in accordance with the drive command.

Note that when it is unnecessary that the inverter for buffer 13-A or 13-B takes in a DC power from the DC link 4-A or 4-B to the servomotor for buffer 12 side, respectively, and when it is unnecessary that the inverter for buffer 13-A or 13-B outputs a DC power to the DC link 4-A or 4-B, respectively, the power storage power supply capacity amount calculated by the power storage power supply capacity amount calculation unit 18 is zero. In such a case, according to Equation 8, the torque command is zero so that it is configured that the motor control units for buffer 16'-A and 16'-B do not perform a torque control but performs merely a speed control to allow the servomotor for buffer 12 to rotate at the predetermined base rotation speed.

Further, in the second embodiment, because merely a torque control is performed but a speed control is not performed, a rotation speed of the servomotor for buffer 12 may continue to endlessly increase or decrease. Then, it may be configured that a speed upper limit value and a speed lower limit value are determined in advance, and when a rotation speed of the servomotor for buffer 12 detected by the speed detection device 32 exceeds the speed upper limit value and when the rotation speed of the servomotor for buffer 12 falls below the speed lower limit value, the motor control units for buffer 16'-A and 16'-B does not perform a torque control but performs merely a speed control to allow the servomotor for buffer 12 to rotate at the predetermined base rotation speed.

The motor control units for buffer 16, 16-A, 16-B, 16', 16'-A, and 16'-B (the speed control units 41-A and 41-B, the torque control units 42-A, 42-B, 42'-A, and 42'-B, the current control units 43-A and 43-B, the speed command switch units 51-A and 51-B, and the torque limit units 52-A and 52-B are included. The same is hereinafter applied), the power consumption amount calculation unit 17, the power storage power supply amount calculation unit 18, the torque limit value calculation unit 19, and the comparison unit 20 as described above are provided, for example, together with the motor control unit for drive 21 within a numerical control device 100. The motor control units for buffer 16, 16-A, 16-B, 16', 16'-A, and 16'-B, the power consumption amount calculation unit 17, the power storage power supply amount calculation unit 18, the torque limit value calculation unit 19, and the comparison unit 20 may be configured, for example, in the form of a software program or may be configured by a combination of each type of electronic circuits and a software program. In each embodiment as described above, the motor control units for buffer 16, 16-A, 16-B, 16', 16'-A, and 16'-B, the power consumption amount calculation unit 17, the power storage power supply amount calculation unit 18, the torque limit value calculation unit 19, and the comparison unit 20 is configured in the form of a software program, and an arithmetic processing unit in the numerical control device 100 is allowed to operate such a software program, thereby realizing a function of each unit.

Alternatively, a computer which operates in accordance with a software program medium for realizing a function of the motor control units for buffer 16, 16-A, 16-B, 16', 16'-A, and 16'-B, the power consumption amount calculation unit 17, the power storage power supply amount calculation unit 18, the torque limit value calculation unit 19, and the comparison unit 20 may be provided separately from the numerical control device 100. Further alternatively, the motor control units for buffer 16, 16-A, 16-B, 16', 16'-A, and 16'-B, the power consumption amount calculation unit 17, the power storage power supply amount calculation unit 18, the torque limit value calculation unit 19, and the comparison unit 20 may be realized as a semiconductor integrated circuit in which a software program medium for realizing a function of each unit is written, and in such a case, the semiconductor integrated circuit is installed, for example, in an existing numerical control device, thereby realizing a function of each unit.

According to the embodiments of the present disclosure, the power storage power device in which the servomotor for buffer for rotating the flywheel is configured to include a plurality of independent windings so that in comparison with a case in which a power storage device is configured using a one-winding type servomotor for buffer, a small-sized and low-cost motor drive system can be realized. Even when a machine (machine tool and robot) to which the servomotors for drive are provided has a large size, the small-sized and low-cost motor drive system can be incorporated into the machine. Further, power conversion of the inverters for buffer respectively connected to the windings of the servomotor for buffer is separately performed so that take-in from the DC links (power storage) and an output to the DC links (power supply) by each of the inverters for buffer can be efficiently performed and losses can be reduced. Still further, a line control of the servomotor for buffer is performed on the basis of not a speed control performed through sequential generation of a speed command but a torque control in accordance with a content of the power storage power supply capacity amount so as to provide an easy control and exhibit a high responsiveness. In addition, creating a speed command in accordance with an operation state and a power consumption of the servomotors for drive is unnecessary and a drive program of the servomotor for buffer can be simplified.

According to one aspect of the present disclosure, in the motor drive system including the flywheel type power storage device, the small-sized and low-cost power storage device easily controlled and exhibiting a high responsiveness can be realized.

The invention claimed is:
1. A motor drive system comprising:
a flywheel capable of storing a rotation energy;
at servomotor for buffer which includes a plurality of independent windings and allows the flywheel to rotate;
a plurality of inverters for buffer respectively connected to the windings, the inverters for buffer performing power conversion between an AC power which is a drive power or a regenerative power of the servomotor for buffer and a DC power in DC links to which the inverters for buffer are respectively connected;
a plurality of converters respectively connected to the DC links to which the inverters for buffer are respectively connected, the converters performing power conver- sion between an AC power at a power supply side and a DC power in the DC links, respectively;

inverters for drive which are connected to any of the DC links and perform power conversion between a DC power in the DC links and an AC power which is a drive power or a regenerative power of servomotors for drive;

motor control units for buffer configured to control driving of the servomotor for buffer by controlling power conversion of the respective inverters for buffer respectively connected to the windings;

a power consumption amount calculation unit configured to calculate, with respect to each of the DC links, a total power consumption amount obtained as a sum of a loss at the converters and the inverters for drive which are respectively connected to the DC links and an output of the servomotors for drive connected to the DC links through the inverters for drive and a winding loss at the servomotors for drive connected to the DC links through the inverters for drive, respectively;

a power storage power supply capacity amount calculation unit configured to calculate, with respect to each of the inverters for buffer, a power storage power supply capacity amount defined as a DC power amount which can be taken in from the DC links or outputted to the DC links by the inverters for buffer, respectively, on the basis of the total power consumption amount and maximum power conversion amounts defined as maximum power amounts within which power conversion by the converters is possible;

a torque limit value calculation unit configured to calculate a torque limit value with respect to the servomotor for buffer on the basis of the power storage power supply capacity amount and a rotation speed of the servomotor for bluffer; and a comparison unit configured to compare a magnitude of an absolute value of a sum total of the power storage power supply capacity amounts for indicating a DC power amount which can be taken in from the DC links by the inverters for buffer and a magnitude of an absolute value of a sum total of the power storage power supply capacity amounts for indicating a DC power amount which can be outputted to the DC links by the inverters for buffer, wherein the motor control units for buffer perform, with respect to the inverter for buffer which can take in a DC power from the DC link, a torque control with respect to the servomotor for buffer, while changing an upper limit value and a lower limit value of a torque command using the torque limit value so as to adjust a DC power amount taken in from the DC link by the inverter for buffer, while not performing, with respect to the inverter for buffer which indicates that a DC power can be outputted to the DC link, a torque control with respect to the servomotor for buffer when the power storage power supply capacity amount determined by the comparison unit to have a large absolute value indicates a DC power amount which can be taken in from the DC link, and performs, with respect to the inverter for buffer which can output a DC power to the DC link, a torque control with respect to the servomotor for buffer, while changing an upper limit value and a lower limit value of a torque command using the torque limit value so as to adjust a DC power amount outputted to the DC link by the inverter for buffer, while not performing, with respect to the inverter for buffer which indicates that a DC power can be taken in from the DC link, a torque control with respect to the servomotor for buffer when the power storage power supply capacity amount determined by the comparison unit to have a large absolute value indicates a DC power amount which can be outputted to the DC link.

2. The motor drive system according to claim 1, wherein the motor control units for buffer perform, with respect to each of the inverters for buffer, a torque control with respect to the servomotor for buffer, while changing an upper limit value and a lower limit value of a torque command using the torque limit value so as to adjust a DC power amount taken in from the DC links by the inverters for buffer when all the respective power storage power supply capacity amounts indicate a DC power amount which can be taken in from the DC links, and perform, with respect to each of the inverters for buffer, a torque control with respect to the servomotor for buffer, while changing an upper limit value and a lower limit value of a torque command using the torque limit value so as to adjust a DC power amount outputted to the DC links by the inverters for buffer when all the respective power storage power supply capacity amounts indicate a DC power amount which can be outputted to the DC links.

3. The motor drive system according to claim 1, wherein the motor control units for buffer control power conversion with respect to the inverters for buffer, while performing a torque control using the torque limit value so that the servomotor for buffer rotates at a rotation speed for power supply smaller than a predetermined base rotation speed when the total power consumption amount exceeds a first threshold value, and control power conversion with respect to the inverter for buffer, while performing a torque control using the torque limit value so that the servomotor for buffer rotates at a rotation speed for power storage larger than the base rotation speed when the total power consumption amount falls below a second threshold value smaller than the first threshold value.

4. The motor drive system according to claim 3, wherein the motor control unit for buffer controls power conversion with respect to the inverter for buffer, while performing a torque control using the torque limit value so that the servomotor for buffer rotates at the base rotation speed when the total power consumption amount falls between the first threshold value and the second threshold value.

5. The motor drive system according to claim 3, wherein the motor control units for buffer control power conversion with respect to the inverters for buffer, while performing a torque control using the torque limit value so that the servomotor for buffer rotates at the base rotation speed when the total power consumption amount falls below a third threshold value smaller than the first threshold value and larger than the second threshold value while the motor control units for buffer control power conversion of the inverters for buffer so that the servomotor for buffer rotates at the rotation speed for power supply, and controls power conversion with respect to the inverter for buffer, while performing a torque control using the torque limit value so that the servomotor for buffer rotates at the base rotation speed when the total power consumption amount exceeds a fourth threshold value larger than the second threshold value and smaller than the third threshold value while the motor control units for buffer control power conversion of the inverters for buffer so that the servomotor for buffer rotates at the rotation speed for power storage.

6. The motor drive system according to claim 3, wherein the first threshold value is set to be the maximum power conversion amount with respect to a conversion operation in which the converters perform power conversion of an AC power to a DC power, or a value smaller than the maximum power conversion amount, and the second threshold value is set to be the maximum power conversion amount with respect to an inversion operation in which the converters perform power conversion of a DC power to an AC power, or a value larger than the maximum power conversion amount.

7. The motor drive system according to claim 3, wherein the motor control units for buffer perform switching of respective speed commands for rotating the servomotor for buffer at the rotation speed for power supply, the base rotation speed, and the rotation speed for power storage in a stepwise manner each between the speed commands.

8. The motor drive system according to claim 3, wherein the motor control units for buffer perform switching of respective speed commands for rotating the servomotor for buffer at the rotation speed for power supply, the base rotation speed, and the rotation speed for power storage in a continuous manner without a gap each between the speed commands.

9. The motor drive system according to claim 1, wherein the motor control units for buffer perform, with respect to each of the inverters for buffer, a torque control using a torque command with respect to the servomotor for buffer generated on the basis of the power storage power supply capacity amounts with respect to the inverters for buffer calculated by the power storage power supply capacity amount calculation unit and a rotation speed of the servomotor for buffer so as to adjust a DC power amount taken in from the DC links or outputted to the DC links by the inverters for buffer, respectively.

* * * * *